(12) United States Patent
Fushimi

(10) Patent No.: US 8,396,343 B2
(45) Date of Patent: Mar. 12, 2013

(54) DATA CONVERSION METHOD AND DATA CONVERSION DEVICE, DATA RECORDING DEVICE, DATA PLAYING DEVICE, AND COMPUTER PROGRAM

(75) Inventor: Toshihiko Fushimi, Tokyo (JP)

(73) Assignee: Sony Corporation, Tokyo (JP)

( * ) Notice: Subject to any disclaimer, the term of this patent is extended or adjusted under 35 U.S.C. 154(b) by 963 days.

(21) Appl. No.: 12/212,153

(22) Filed: Sep. 17, 2008

(65) Prior Publication Data

US 2009/0109333 A1    Apr. 30, 2009

(30) Foreign Application Priority Data

Oct. 25, 2007    (JP) .................................. 2007-277940

(51) Int. Cl.
*H04N 7/01*    (2006.01)
(52) U.S. Cl. ........................ 386/232; 348/441
(58) Field of Classification Search ........................ None
See application file for complete search history.

(56) References Cited

U.S. PATENT DOCUMENTS

| | | | | |
|---|---|---|---|---|
| 8,181,209 | B2 * | 5/2012 | Hasek et al. ..................... | 725/93 |
| 2005/0117880 | A1 | 6/2005 | Seo et al. | |
| 2006/0165388 | A1 * | 7/2006 | Uesaka et al. ................ | 386/125 |
| 2006/0203920 | A1 | 9/2006 | Yongfang et al. | |
| 2007/0081669 | A1 | 4/2007 | Takashima et al. | |
| 2007/0081790 | A1 * | 4/2007 | Lee et al. ......................... | 386/95 |
| 2007/0297761 | A1 * | 12/2007 | Shibutani ........................ | 386/95 |
| 2007/0297762 | A1 * | 12/2007 | Shibutani ........................ | 386/95 |
| 2007/0297764 | A1 * | 12/2007 | Shibutani ........................ | 386/95 |
| 2008/0019671 | A1 * | 1/2008 | Marumori ..................... | 386/124 |
| 2008/0107170 | A1 * | 5/2008 | Ong et al. ................ | 375/240.01 |

FOREIGN PATENT DOCUMENTS

| | | |
|---|---|---|
| EP | 1 316 960 A1 | 6/2003 |
| EP | 1 585 128 A1 | 10/2005 |
| JP | 2003-151215 | 5/2003 |
| JP | 2004-199787 | 7/2004 |
| JP | 2006-319954 | 11/2006 |
| JP | 2007-129368 | 5/2007 |
| JP | 2007-200518 | 8/2007 |
| JP | 2007-334945 | 12/2007 |
| JP | 2008-311871 | 12/2008 |

OTHER PUBLICATIONS

"IEEE 100 The Authoritative Dictionary of IEEE Standards Terms", Seventh Edition, IEEE Std 100-2000, vol., No., 2000 doi: 10.1109/IEEESTD.2000.322230, pp. 716.*
Douglas Dixon, "Ulead DVD MovieFactory 6", Manifest Technology, XP002506651, May 2007, 6 pages.
"TMPGEnc 4.0 X Press Product Information", XP002508170, Jun. 26, 2008, 2 pages.

* cited by examiner

*Primary Examiner* — Philip Chea
*Assistant Examiner* — Dorianne Alvarado David
(74) *Attorney, Agent, or Firm* — Oblon, Spivak, McClelland, Maier & Neustadt, L.L.P.

(57) ABSTRACT

A data conversion method for an information processing device to execute format conversion processing from AVCHD (Advanced Video Codec high Definition) format to BDAV (Blu-ray Disc Audio Visual) format includes the steps of: performing data input for a data input unit to input AVCHD format data; and performing format conversion for a format converter to select a playback control information file included in the input AVCHD format data, perform format conversion, and generate playback control information according to BDAV format; wherein conversion processing is not performed for a stream file included in the input AVCHD format data, and BDAV format data made up of a converted playback control information file and non-converted stream file is generated.

18 Claims, 20 Drawing Sheets

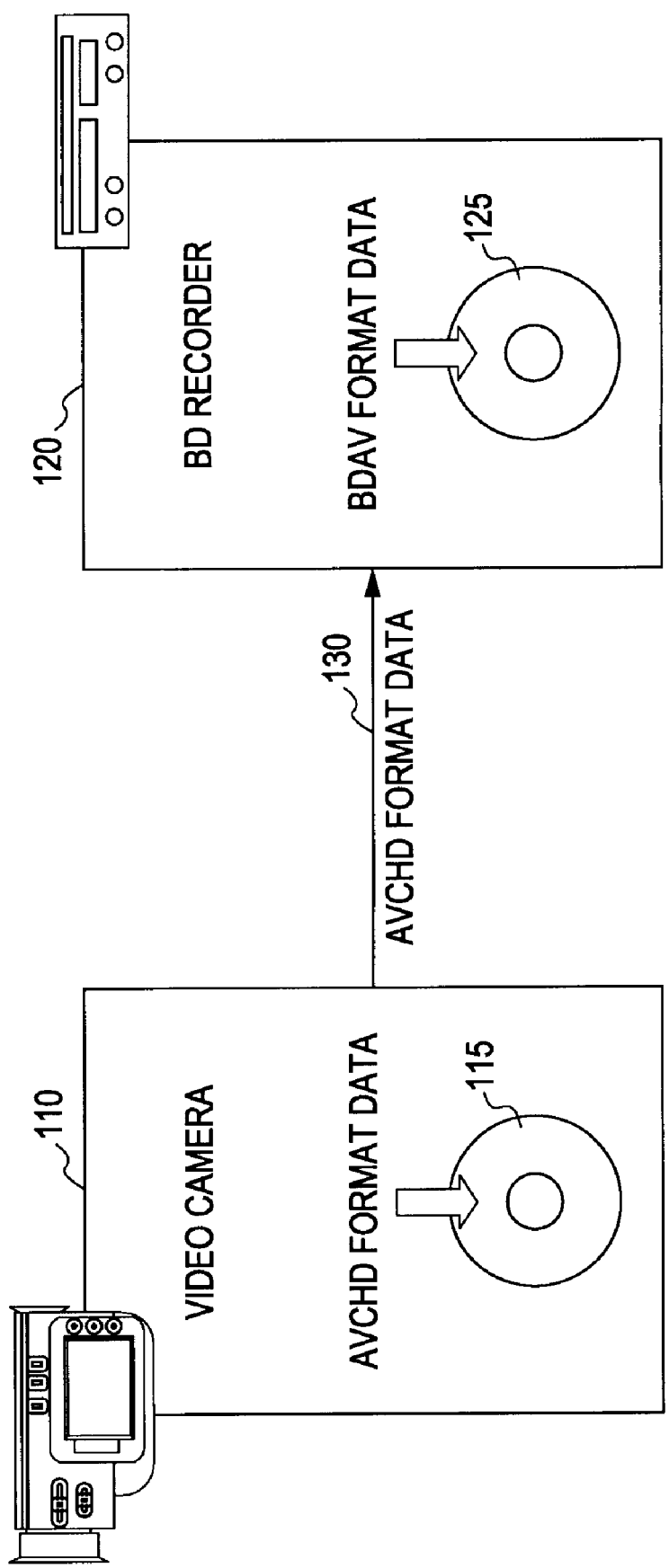

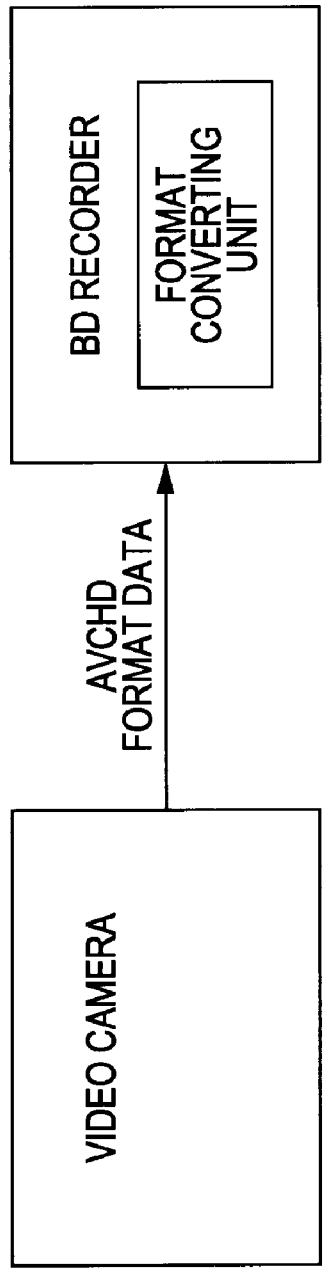
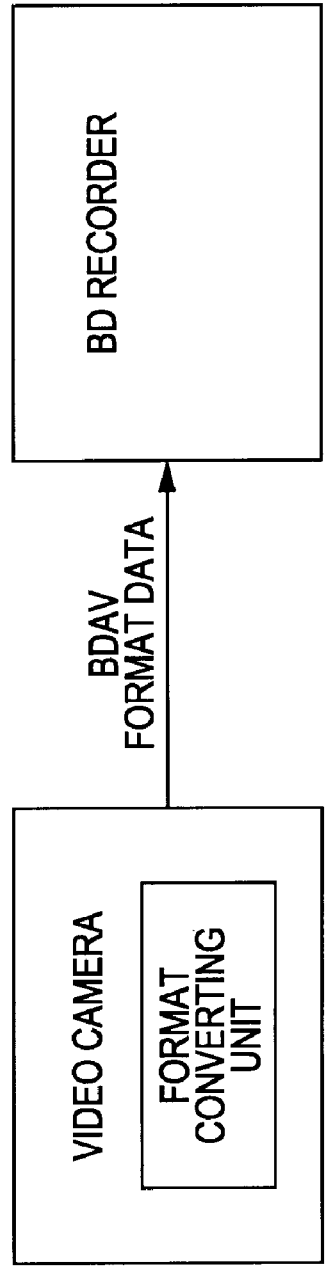
FIG. 2A
FIG. 2B
FIG. 2C

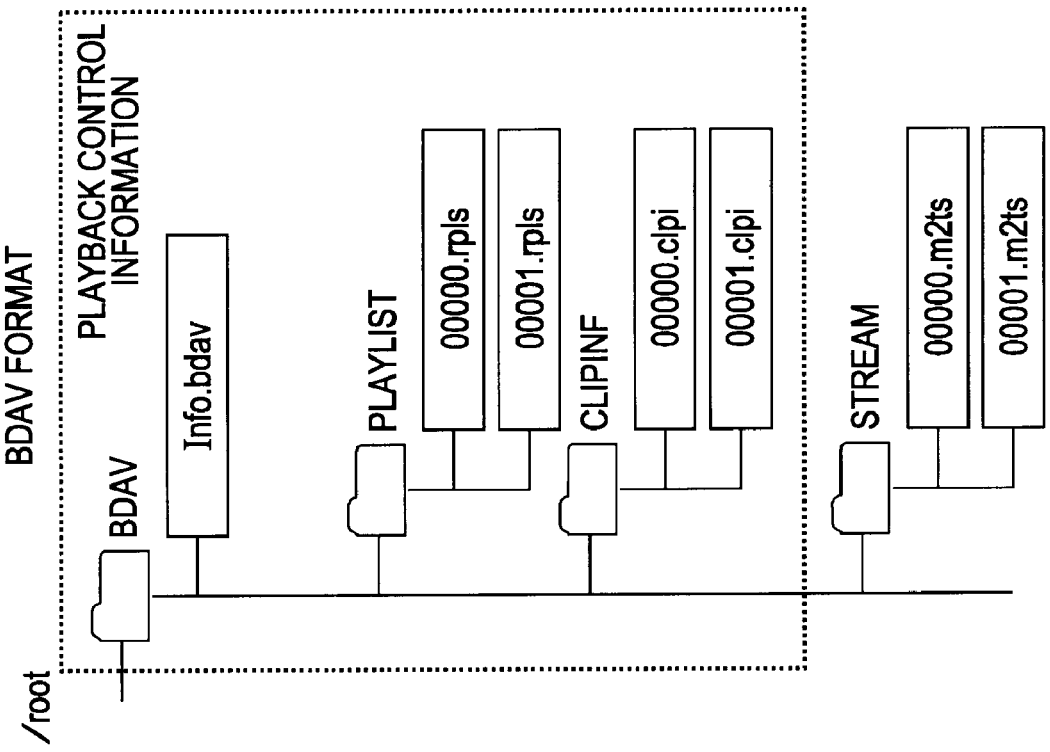
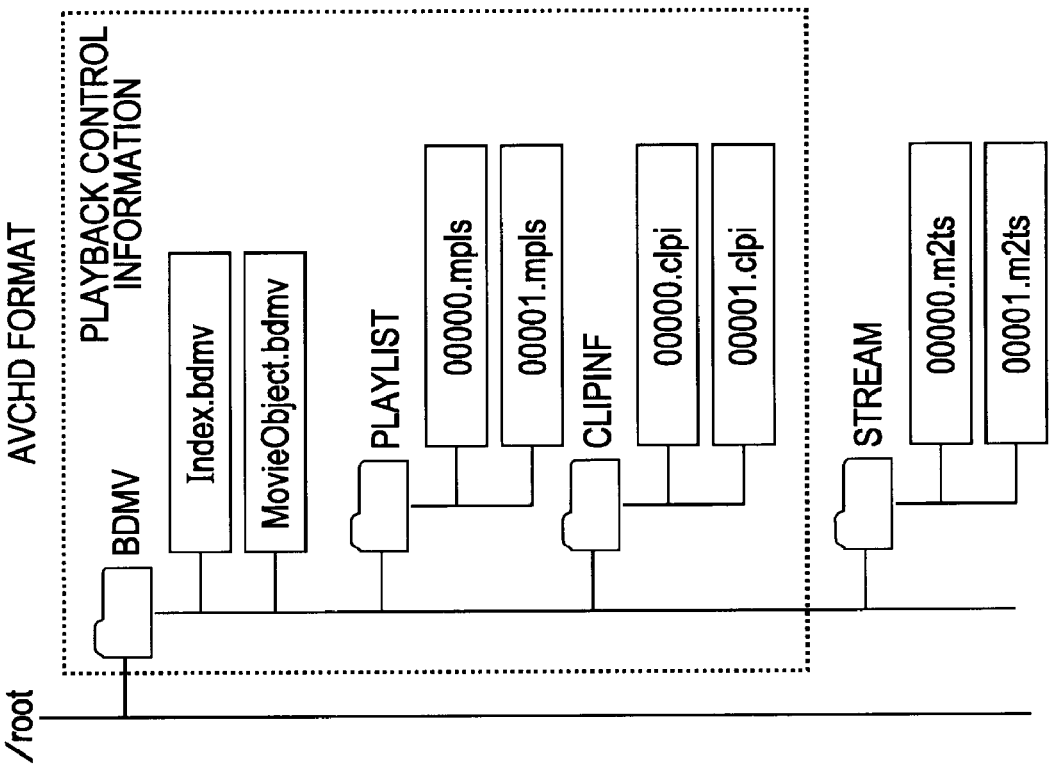

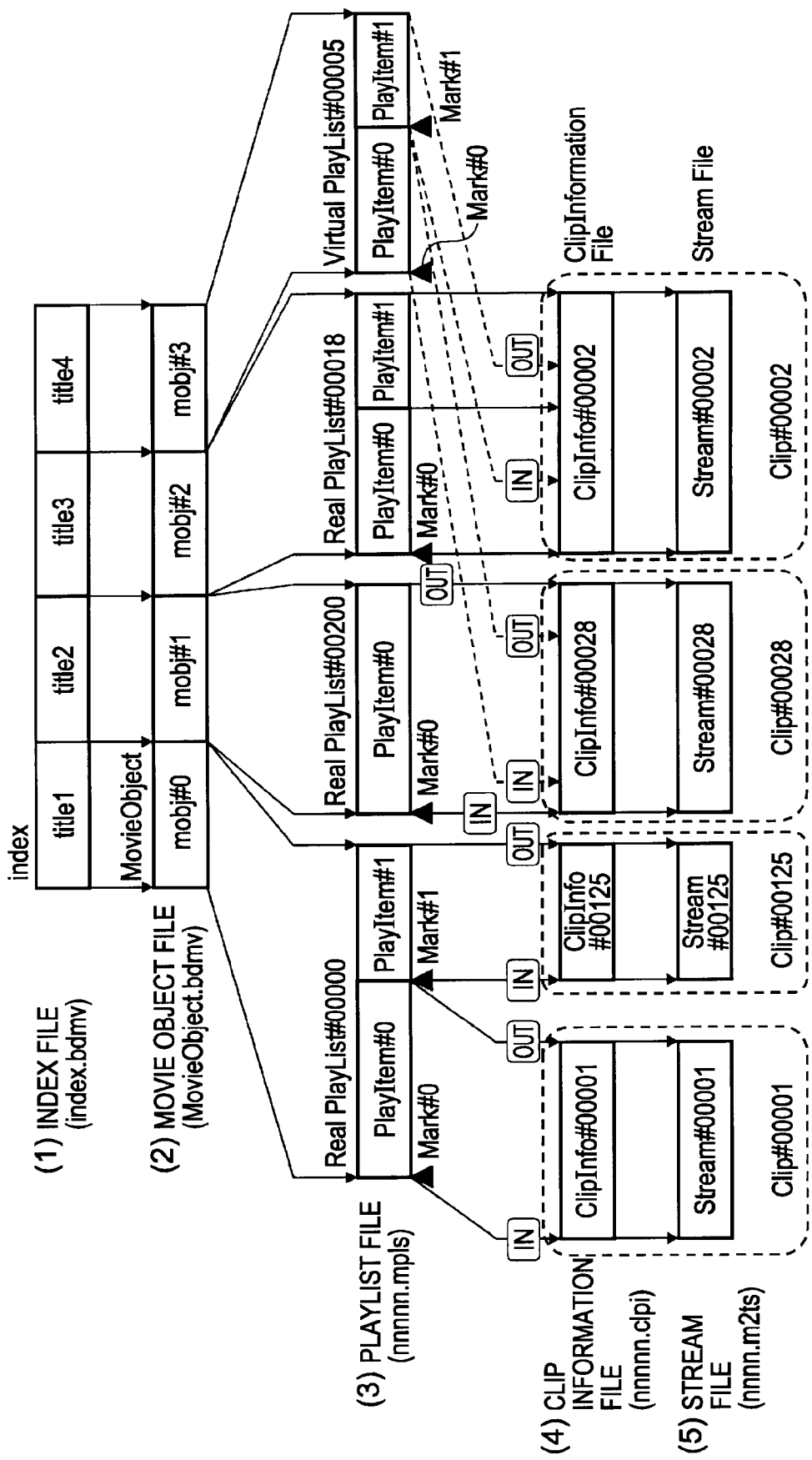

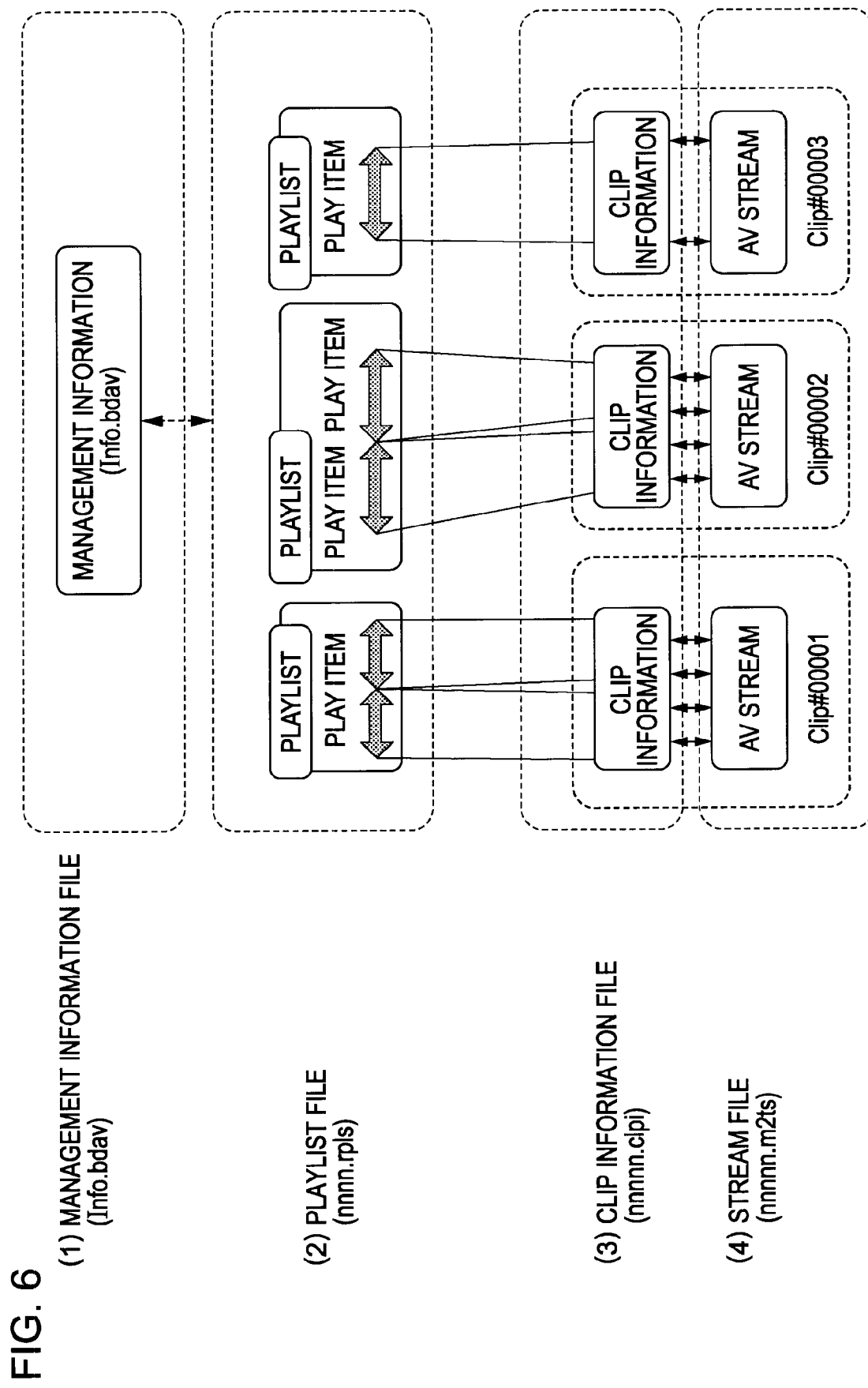

FIG. 13

AVCHD

| BLOCK | FIELD | bit | |
|---|---|---|---|
| PlayItem | Length | 16 | |
| | ClipInformationFileName | 40 | |
| [A] | ClipCodecIdentifier | 32 | |
| | reserved | 12 | |
| [B] | ConnectionCondition | 4 | |
| | RefToSTCID | 8 | |
| [C] | INTime | 32 | |
| [D] | OUTTime | 32 | |
| | blkUOMaskTable() | 64 | |
| | PlayItemRandomAccessFlag | 1 | |
| | reserved | 7 | |
| | StillMode | 8 | |
| | StillTime | 16 | |
| 34 | blkSTNTable() | MAX: 1280 | |
| MAX: 194 | | | |

BDAV (BD-RE2.1)

| BLOCK | FIELD | bit | PROCESSING | |
|---|---|---|---|---|
| PlayItem 22byte | length | 16 | 22 (STIPULATED VALUE) | |
| | Clip_Information_file_name | 40 | REWRITE | * |
| | Clip_codec_identifier | 32 | COPY | [A] |
| | reserve | 12 | | |
| | connection_condition | 4 | COPY | [B] |
| | ref_to_STC_id | 8 | REWRITE | * |
| | IN_time | 32 | COPY | [C] |
| | OUT_time | 32 | COPY | [D] |
| BridgeSequenceInfo | Bridge_Clip_Information_file_name | 40 | | |
| | Clip_codec_identifier | 32 | | |
| | reserve | 10 | | |
| | | 8 | | |

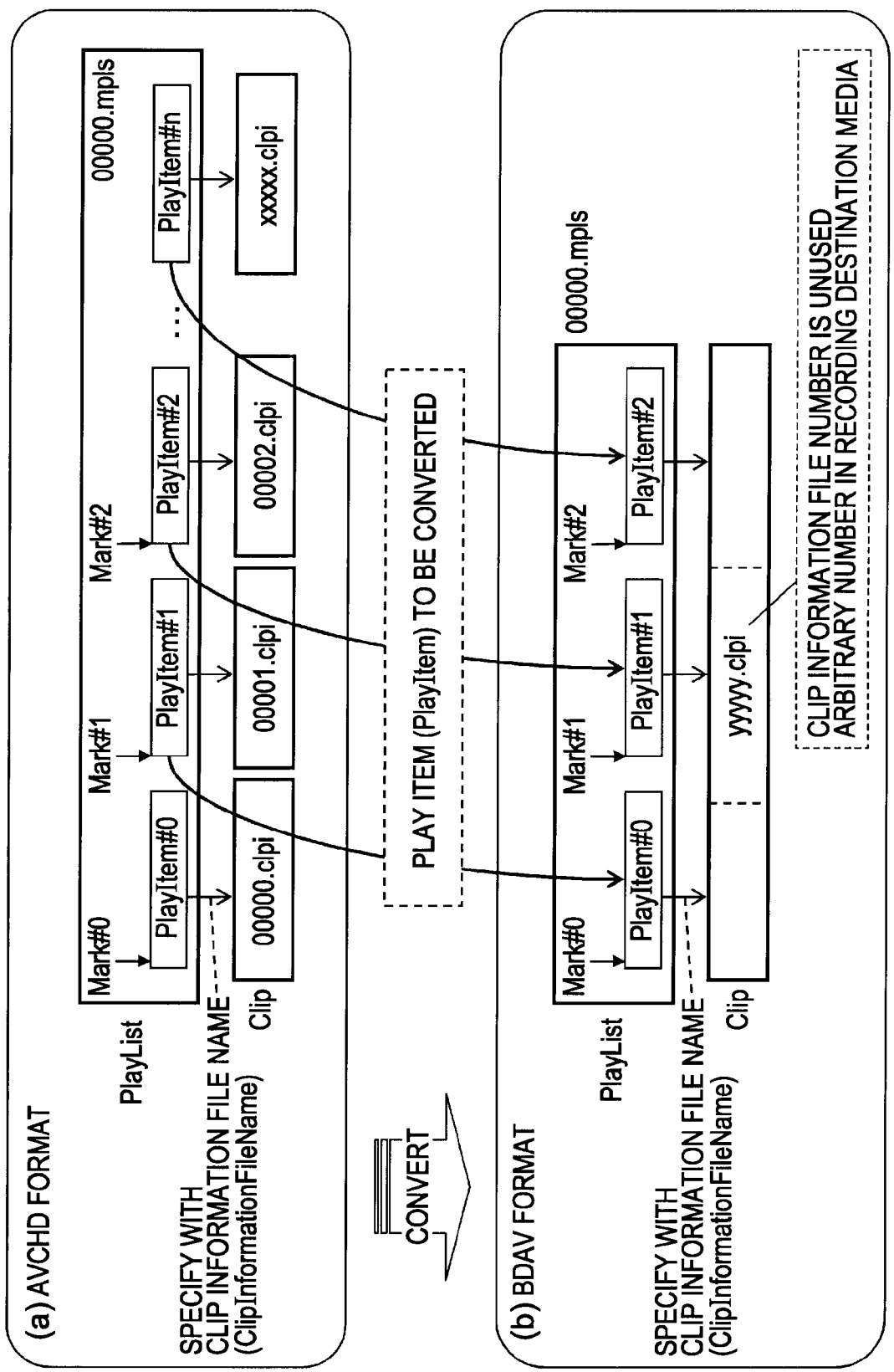

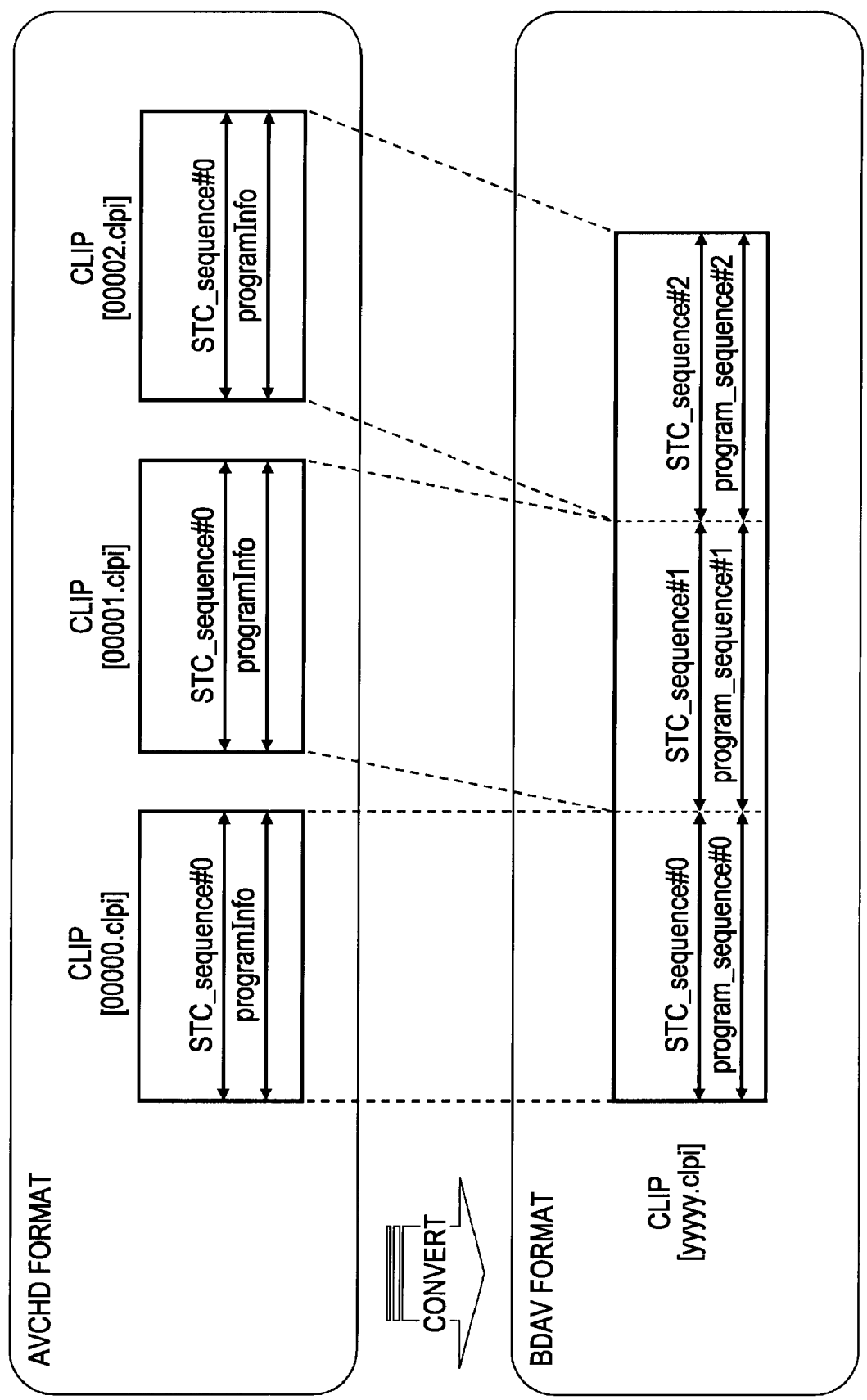

DATA CONVERSION METHOD AND DATA CONVERSION DEVICE, DATA RECORDING DEVICE, DATA PLAYING DEVICE, AND COMPUTER PROGRAM

CROSS REFERENCES TO RELATED APPLICATIONS

The present invention contains subject matter related to Japanese Patent Application JP 2007-277940 filed in the Japanese Patent Office on Oct. 25, 2007, the entire contents of which are incorporated herein by reference.

BACKGROUND OF THE INVENTION

1. Field of the Invention

The present invention relates to a data conversion method and data conversion device, data recording device, data playing device, and computer program. In particular, the present invention relates to a data conversion method and data conversion device, data recording device, data playing device, and computer program wherein processing to convert AVCHD format data into BDAV format data is performed.

2. Description of the Related Art

AVCHD (Advanced Video Codec High Definition) is related art regarding a data recording format for a video camera. In the processing for recording a moving image stream photographed with a video camera to media according to AVCHD format, the photographed moving image data is encoded as a MPEG4-AVC stream (e.g. H.264/AVC stream), while the files of index (index), movie object (MovieObject), playlist (PlayList), clip information (ClipInformation), and stream (Stream) are generated and recorded in media such as a hard disk or flash memory. Note that specific format configurations will be described later.

On the other BLU-RAY DISC® is related art with regard to a recording medium that can record high density data. Hereafter, BLU-RAY® will be called "BD". BDAV (Blu-ray Disk Audio Visual) format is a data recording format corresponding to a rewritable disk permitted data re-recording with BD. BDAV format is described in Japanese Unexamined Patent Application Publication No. 2006-319954.

SUMMARY OF THE INVENTION

The above-described AVCHD format and BDAV format are different format, and there is a problem wherein data recorded on media with AVCHD format cannot be handled with a device that handles BDAV format such as a BD recorder.

It has been found desirable to provide a data conversion method and data conversion device, data recording device, data playing device, and computer program which enables converting AVCHD format data into BDAV format data to record onto a BLU-RAY® in order to enable data recorded on media with AVCHD format with a video camera for example to be played back with a device that handles BDAV format.

According to an embodiment of the present invention, a data conversion method for an information processing device to execute format conversion processing from AVCHD (Advanced Video Codec high Definition) format to BDAV (Blu-ray Disc Audio Visual) format is a data conversion method including the steps of: data input for a data input unit to input AVCHD format data; and format conversion for a format converter to select a playback control information file included in the input AVCHD format data, perform format conversion, and generate playback control information according to BDAV format; wherein conversion processing is not performed for a stream file included in the input AVCHD format data, and BDAV format data made up of a converted playback control information file and non-converted stream file is generated.

The data conversion method may further include a step of performing data recording for a data recording unit to record BDAV format data generated by the format converter onto media.

The format conversion step may include a step of executing processing to select an index file, a playlist file, and a clip information file as a playback control information file included in the AVCHD format to be converted, and generate a management information file, playlist file, and clip information file according to the BDAV format by format conversion of the selected file.

The format conversion step may include a step of executing processing to merge multiple clips included in the AVCHD format data into one clip according to the BDAV format.

The format conversion step, with generating processing for one clip information file according to the BDAV format, may include the steps of: obtaining field data for multiple clip information included in AVCHD format data; and using the obtained data to determine the field data of one clip information file according to the BADV format.

The format conversion step may include a step, of setting new identifiers for the BDAV format data without using the identifiers in the AVCHD format data, regarding a clip information file identifier, play item identifier, and STC identifier.

The format conversion step may include a step of performing identifier setting processing, wherein the identifier of the clip information file included in the BDAV format data serves as an identifier not used with the media that records the BDAV format data.

The format conversion step may include a step of performing setting processing for playlist identifiers made up of numerical values incremented by 1 at a time, for multiple play items set in one playlist included in the BDAV format data.

The format conversion step may include a step of performing setting processing for STC identifiers made up of numerical values incremented by 1 at a time, for multiple STC set in one clip information file included in the BDAV format data.

The format conversion step may include a step of employing user defined data included in the AVCHD format to generate user defined data corresponding to the BD format.

The format conversion step may include a step of employing mark information included in the AVCHD format to generate a mark information block according to BDAV format, for information relating to a mark (Mark) indicating a certain temporal position in the playback content.

According to an embodiment of the present invention, a data converting device configured to execute format conversion processing from AVCHD (Advanced Video Codec high Definition) format to BDAV (Blu-ray Disc Audio Visual) format is a data converting device including: a data input unit to input AVCHD format data; and a format converter to select a playback control information file included in the input AVCHD format data via the data input unit, perform format conversion, and generate playback control information according to the BDAV format; wherein conversion processing is not performed for a stream file included in the input AVCHD format data, and BDAV format data made up of a converted playback control information file and non-converted stream file is generated.

The format converter may execute processing to select an index file, a playlist file, and a clip information file as a playback control information file included in the AVCHD format, and with the format conversion of the selected file, to generate a management information file, playlist file, and clip information file according to the BDAV format.

The format converter may execute processing to merge multiple clips included in the AVCHD format data into one clip according to the BDAV format.

According to an embodiment of the present invention, a data recording device configured to execute format conversion processing from AVCHD (Advanced Video Codec high Definition) format to BDAV (Blu-ray Disc Audio Visual) format, and execute data recording as to media, is a data recording device including: a data input unit to input AVCHD format data; and a format converter to select a playback control information file included in the input AVCHD format data via the data input unit, perform format conversion, and generate playback control information according to the BDAV format; wherein conversion processing is not performed for a stream file included in the input AVCHD format data, and BDAV format data made up of a converted playback control information file and non-converted stream file is generated; and a data recording unit to record the BDAV format data generated by the format converter on the media.

According to an embodiment of the present invention, a data playback device configured to execute format conversion processing from AVCHD (Advanced Video Codec high Definition) format to BDAV (Blu-ray Disc Audio Visual) format, and output converted data, is a data playback device including: a data playback unit to execute data playback from the media wherein the AVCHD format data is recorded; a format converter to select a playback control information file included in the AVCHD format data to be played back by the data playback unit, perform format conversion, and generate playback control information according to the BDAV format; wherein conversion processing is not performed for a stream file included in the input AVCHD format data, and BDAV format data made up of a converted playback control information file and non-converted stream file is generated; and a data output unit to output the BDAV format data generated by the format converter externally.

According to an embodiment of the present invention, a computer program to cause execution of format conversion processing from AVCHD (Advanced Video Codec high Definition) format to BDAV (Blu-ray Disc Audio Visual) format with an information processing device is a computer program including the steps of: performing data input for a data input unit to input AVCHD format data; and performing format conversion for a format converter to select a playback control information file included in the input AVCHD format data, perform format conversion, and generate playback control information according to BDAV format; wherein conversion processing is not performed for a stream file included in the input AVCHD format data, and BDAV format data made up of a converted playback control information file and non-converted stream file is generated.

Note that the computer program according to the present invention is a computer program which can provide various program codes in a computer readable format as to a general-purpose computer system which can execute the program codes, with a storage medium and communication medium, for example. By providing such a program in a computer-readable format, processing according to the program is realized on the computer system.

Other objectives, features, and advantages of the present invention will become clear through the detailed description based on the later-described embodiments of the present invention and appended drawings. Note that the term "system" as used in the present specification refers to a theoretical collective configuration of multiple devices, and is not limited to devices of various configurations which are housed in the same casing.

According to the above configurations, with an arrangement to execute format conversion processing from AVCHD format to BDAV format, a playback control information file included in the AVCHD format data is selected and format conversion performed, and playback control information generated according to the BDAV format, while conversion processing for a stream file included in the AVCHD format data is not performed, and the BDAV format data made up of converted playback control information files and non-converted stream files are generated, enabling information necessary for conversion to be efficiently obtained from the selected file and file conversion to be performed, whereby high speed format conversion can be realized.

BRIEF DESCRIPTION OF THE DRAWINGS

FIG. 1 is a block diagram to describe an overview of the configuration and processing according to an embodiment of the present invention;

FIG. 2 is a diagram to describe a configuration example to execute the processing according to the present invention;

FIGS. 4A and 4B are diagrams to describe a directory configuration of the AVCHD format and BDAV format;

FIG. 5 is a diagram to describe the correlation between files set with the AVCHD format;

FIG. 6 is diagram to describe the correlation between files set with the BDAV format;

FIG. 13 is a diagram describing a playlist file conversion processing example with the format conversion processing according to an embodiment of the present invention;

FIG. 19 is a diagram describing a resetting processing example for each identifier with the format conversion processing according to an embodiment of the present invention; and FIG. 20 is a diagram describing a resetting processing example for each identifier with the format conversion processing according to an embodiment of the present invention.

DESCRIPTION OF THE PREFERRED EMBODIMENTS

Figure 3B:
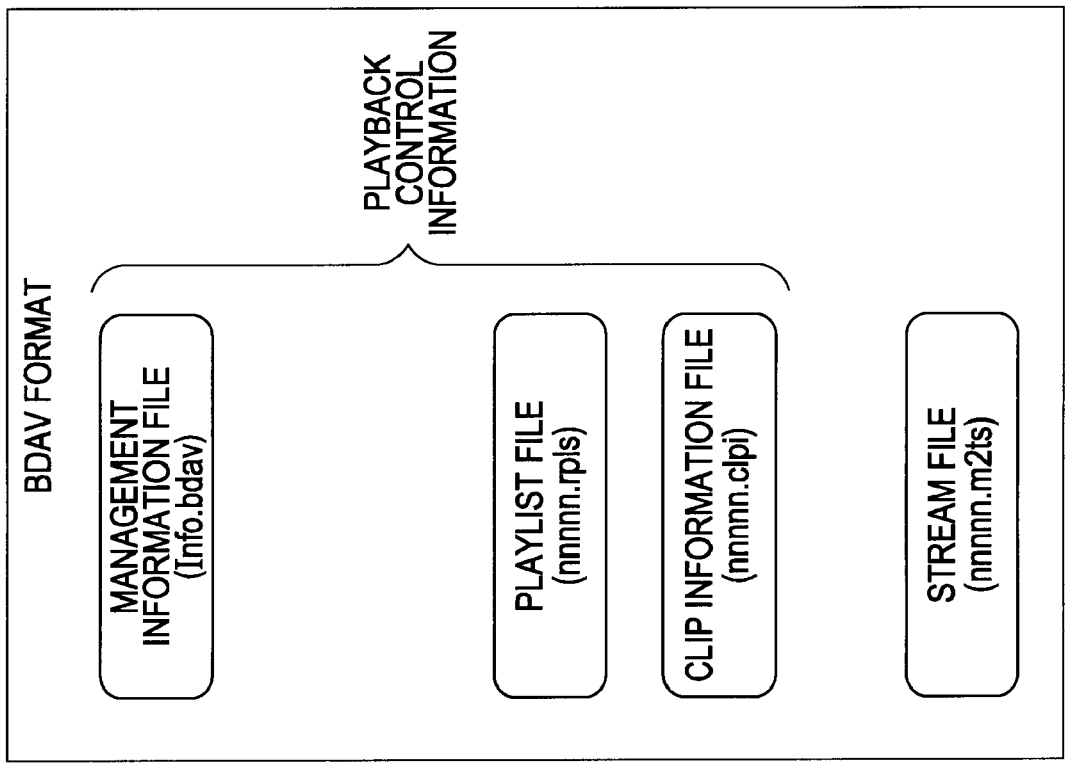
FIGS. 3A and 3B are diagrams to describe AVCHD format and BD format.

A data conversion method and data conversion device, data recording device, data playing device, and computer program according to the present invention will be described in detail with reference to the drawings below.

The present invention performs processing to convert recorded data in AVCHD (Advanced Video Codec High Definition) format which is a data recording format for a video camera into BDAV (Blu-ray Disc Audio Visual) format which is a BDAV BLU-RAY® data recording format.

For example as shown in FIG. 1, an image shot with a video camera 110 is recorded on media 115 in AVCHD format. The AVCHD format data recorded on the recording media 115 is output to a BD recorder 120 via a USB cable 130, for example, whereby format conversion processing from the AVCHD format to the BVAD format is executed with the BD recorder 120, and the data is recorded on a recording media 125.

The BD recorder is a recorder which can playback the recorded data according to the BDAV format, and the video photography image recorded on the recording media 125 by the format conversion can be played back with the BD recorder 120 by the format conversion.

Note that with the example shown in FIG. 1, the device executing the format conversion processing is the BD recorder 120, and with the embodiment described below a configuration example wherein the BD recorder 120 performs format conversion will be described, but for example as shown in FIG. 2, the format conversion processing can be one of the configuration of (a) configuration to set a format converter on the recording device side,
(b) configuration to set a format converter on the playback device side, and
(c) configuration to set an independent format converting device, whereby the format conversion processing according to the present invention can be executed with various devices.

Figure 3A:
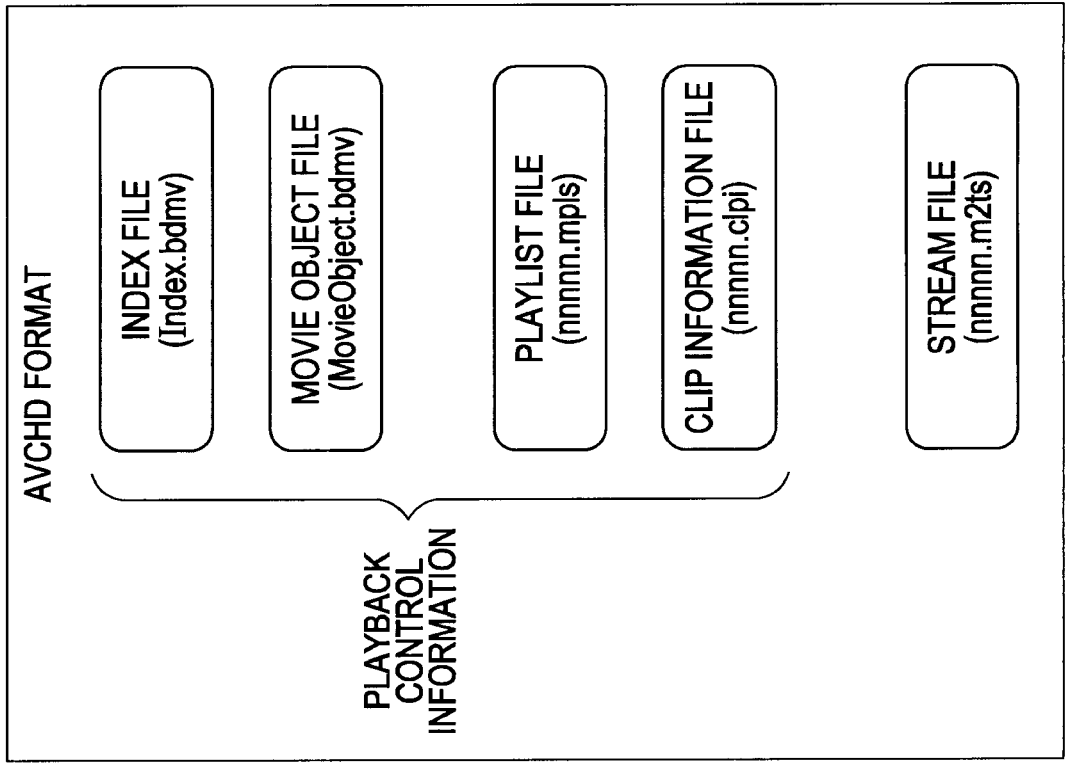

Next, an overview of AVCHD format and BDAV format will be described with reference to FIGS. 3A and 3B and subsequent drawings. FIGS. 3A and 3B show (A) a file set with AVCHD format, and
(B) a file set with BDAV format (BD-RE2.1).

With both the AVCHD format and BDAV format, the content actual portion such as shot data is stored in a stream file (nnnnn.m2ts). The stream file itself is a MPEG4-AVC stream (e.g. H.264/AVC stream) encoded data, and is data of the same format.

Further, as playback control information other than the content actual data, with the (A) AVCHD format, a (1) index (index.bdmv) file, (2) movie object (MovieObject.bdmv) file, (3) playlist (PlayList) file, and (4) clip information (ClipInformation) file are recorded, and with the (B) BDAV format (BD-RE2.1), the data of a (1) management information (info.bdav) file, (2) playlist (PlayList) file, and (3) clip information (ClipInformation) file are recorded. The playback control information in the AVCHD format and the playback control information in the BDAV format are similar data, but are not the same.

A directory configuration corresponding to each format is shown in FIGS. 4A and 4B. FIGS. 4A and 4B show a director configuration for both formats of a (A) directory configuration in AVCHD format and (B) directory configuration in BDAV format (BD-RE2.1). As shown in the directory configuration, multiple playlist files, clip information files, and stream files are set.

The directory configuration of the (A) AVCHD format will be described. Only the two index file [Index.bdmv] and movie object file [MovieObject.bdmv] can be placed directly below the directory [BDMV]. Also, below the BDMV directory [BDMV] a playlist directory [PLAYLIST], clip information directory [CLIPINF], and stream directory [STREAM] are placed.

The index file [Index.bdmv] has description of the content in the directory BDMV. Also, the movie object file [MovieObject.bdmv] has one or more movie object information stored therein.

The playlist directory [PLAYLIST] includes a playlist file [nnnnn.mpls] which is a file relating to a movie playlist. The playlist file [nnnnn.mpls] is a file created as to each of the movie playlists. With the file name, the [nnnnn] before the [.] (period) is a 5-digit number, and the [mpls] after the period is an extension which is fixed for this type of file.

The clip information directory [CLIPINF] includes the clip information file [nnnnn.clpi] as to each of the AV stream files. With the file name, the [nnnnn] before the [.] (period) is a 5-digit number, and the [clip] after the period is an extension which is fixed for this type of file.

The stream directory [STREAM] is a directory wherein an actual AV stream file is placed. That is to say, the stream directory [STREAM] includes a clip AV stream file corresponding to each of the clip information files. The AV stream file is made up of a MPEG4-AVC (e.g. H.264/AVC) transport stream, and the file name is [nnnnn.m2ts]. In the file name, the [nnnnn] before the period is the same as the corresponding clip information file, whereby the correlation between the clip information file and the clip AV stream file can be readily understood.

Next, the directory configuration of the (B) BDAV format will be described. The management information file [index.bdav] is placed directly below the directory [BDAV]. Also, below the BDAV directory [BDAV] a playlist directory [PLAYLIST], clip information directory [CLIPINF], and stream directory [STREAM] are placed.

The management information file [index.bdav] has description of the content in the directory BDAV.

The playlist directory [PLAYLIST] includes a playlist file [nnnnn.rpls] which is a file relating to a movie playlist. The playlist file [nnnnn.rpls] is a file created as to each of the movie playlists. In the file name, the [nnnnn] before the [.] (period) is a 5-digit number, and the [rpls,] after the period is an extension which is fixed for this type of file.

The clip information directory [CLIPINF] includes the clip information file [nnnnn.clpi] as to each of the AV stream files.

In the file name, the [nnnnn] before the [.] (period) is a 5-digit number, and the [clip] after the period is an extension which is fixed for this type of file.

The stream directory [STREAM] is a directory wherein an actual AV stream file is placed. That is to say, the stream directory [STREAM] includes an AV stream file corresponding to each of the clip information files. The AV stream file is made up of a MPEG4-AVC (e.g. H.264/AVC) transport stream (MPEG2-TS), and the file name is [nnnnn.m2ts]. In the file name, the [nnnnn] before the period is the same as the corresponding clip information file, whereby the correlation between the clip information file and the clip AV stream file can be readily understood.

The role of each file in AVCHD format and BDAV format will be described with reference to FIGS. 5 and 6. FIG. 5 is a diagram to describe data recording configuration according to AVCHD format. With the data recording processing according to AVCHD format, each of a (1) index (Index) file, (2) movie object (MovieObject) file, (3) playlist (PlayList) file, (4) clip information (ClipInformation) file, and (5) stream (AVStream) file, are generated and recorded.

The details of each file will be described below.
(1) An index (Index) file is a management file that manages the entire media, and is a file to manage a title to show the user which the user can specify at the time of playing back the content and manage the correlation of the MovieObject equivalent to a playback program.
(2) A movie object (MovieObject) file is a file equivalent to a playback program, and is a file used according to the title selected by the user, to specify a playlist used for playback.
(3) A playlist (PlayList) file is made up of at least one or more play items. Each play item has a playback start point (In point) and a playback end point (OUT point) as to the clip, thereby specifying the playback segment thereof. By lining of multiple play items on a temporal axis in the playlist, the playback sequence of each playback segment can be specified. Note that a mark (Mark) showing a certain temporal position of the playback content is set in the playlist file. Generally the space between marks is called a chapter.

Note that a playlist may be a real playlist or a virtual playlist. A real playlist is a playlist for an original title, and pictures recorded/played back are registered in the recorded order. A virtual playlist is a playlist to create a user defined playback list by editing.
(4) A clip information (ClipInformation) file has information relating to a stream necessary for playing back an actual stream described therein, and is a file that corresponds one-to-one with the AV stream and defines the attributes with the corresponding AV stream. For example, coding, size, time-to-address conversion, playback management information, time map and so forth are included therein.
(5) A stream (AVStream) file is a file wherein a MPEG4-AVC stream (e.g. H.264/AVC stream) generated from moving image data photographed with a video camera is stored.

Note that a set of one clip information (ClipInformation) file and a stream file specified by such clip information (ClipInformation) file is called a clip [Clip]. In the example shown in the diagram, Clip #00001, Clip #00125, Clip #00028, and Clip #00002 are shown.

Next, the data recording configuration according to the BDAV format will be described with reference to FIG. 6. With the recording processing according to the BDAV format, each file of (1) management information (Info) file, (2) playlist (PlayList) file, (3) clip information (ClipInformation) file, and (4) stream (AVStream) file are generated and recorded.

The details of each file will be described.
(1) A management information (Info) file is a file corresponding to the index (Index) file in the AVCHD format, and manages the title to show to the user. However, no MovieObject file exists in the BDAV format, whereby the management information (Info) file is used according to the title selected by the user, and specifies the playlist used for playback.
(2) A playlist (PlayList) file corresponds to the playlist (PlayList) file in the AVCHD format, and is made up of at least one or more play items.
(3) A clip information (ClipInformation) file corresponds to the clip information (ClipInformation) file in the AVCHD format, and information relating to a stream necessary for playing back an actual stream is described therein.
(4) A stream (AVStream) file is the same as the stream (AVStream) file in the AVCHD format, and is a file wherein an MPEG4-AVC stream (e.g. H.264/AVC stream) generated from the moving image data is stored.

Note that similar to the AVCHD format, with the BDAV format also a set of one clip information (ClipInformation) file and a stream file specified by such clip information (ClipInformation) file is called a clip [Clip]. In the example shown in the diagram, Clip #00001, Clip #00002, and Clip #00003 are shown.

As shown in FIGS. 5 and 6, many of the files specified in the AVCHD format and the files specified in the BDAV format are mostly shared. The stream file (nnnnn.m2ts) storing the actual data of the content is MPEG4-AVC stream (e.g. H.264/AVC stream) data of the same format for either AVCHD format or BDAV format, and while conversion is not necessary, other playback control information than this is not all the same, whereby format conversion becomes necessary.

That is to say, of the playback control information in (A) AVCHD format of a (1) index (index.bdmv) file, (2) movie object (MovieObject.bdmv) file, (3) playlist (PlayList) file, and (4) clip information (ClipInformation) file, and of the playback control information in (B) BDAV format (BD-RE2.1) of a (1) management information (info.bdav) file, (2) playlist (PlayList) file, and (3) clip information (ClipInformation) file, the playback control information herein is not the same, thereby necessitating format conversion for the playback control information herein.

Figure 7:
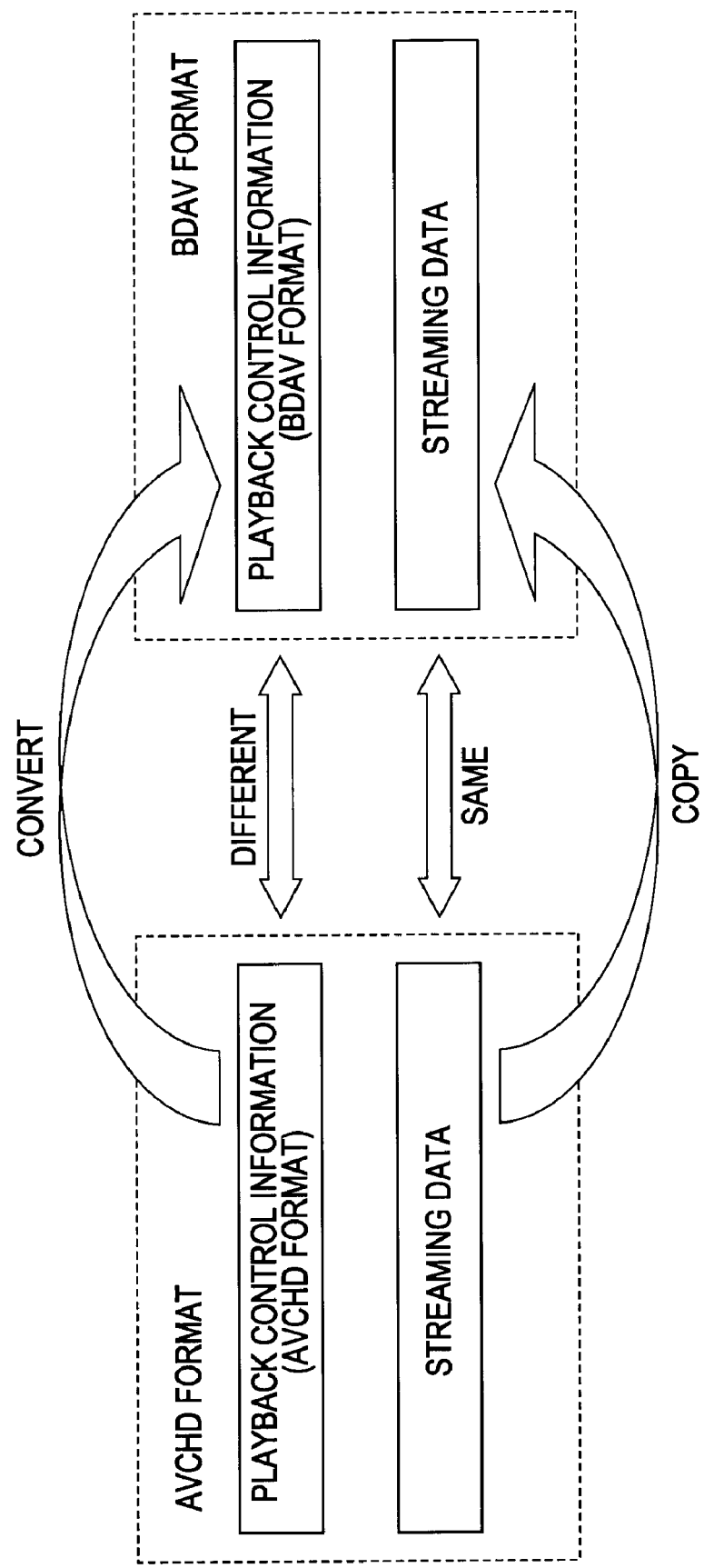
FIG. 7 is a diagram to describe an overview of format conversion processing from AVCHD format to BD format executed with the present invention.

As shown in FIG. 7, only the playback control information other than the streaming data is subject to format conversion, and for the streaming data, file copy processing is executed without conversion.

Figure 8:
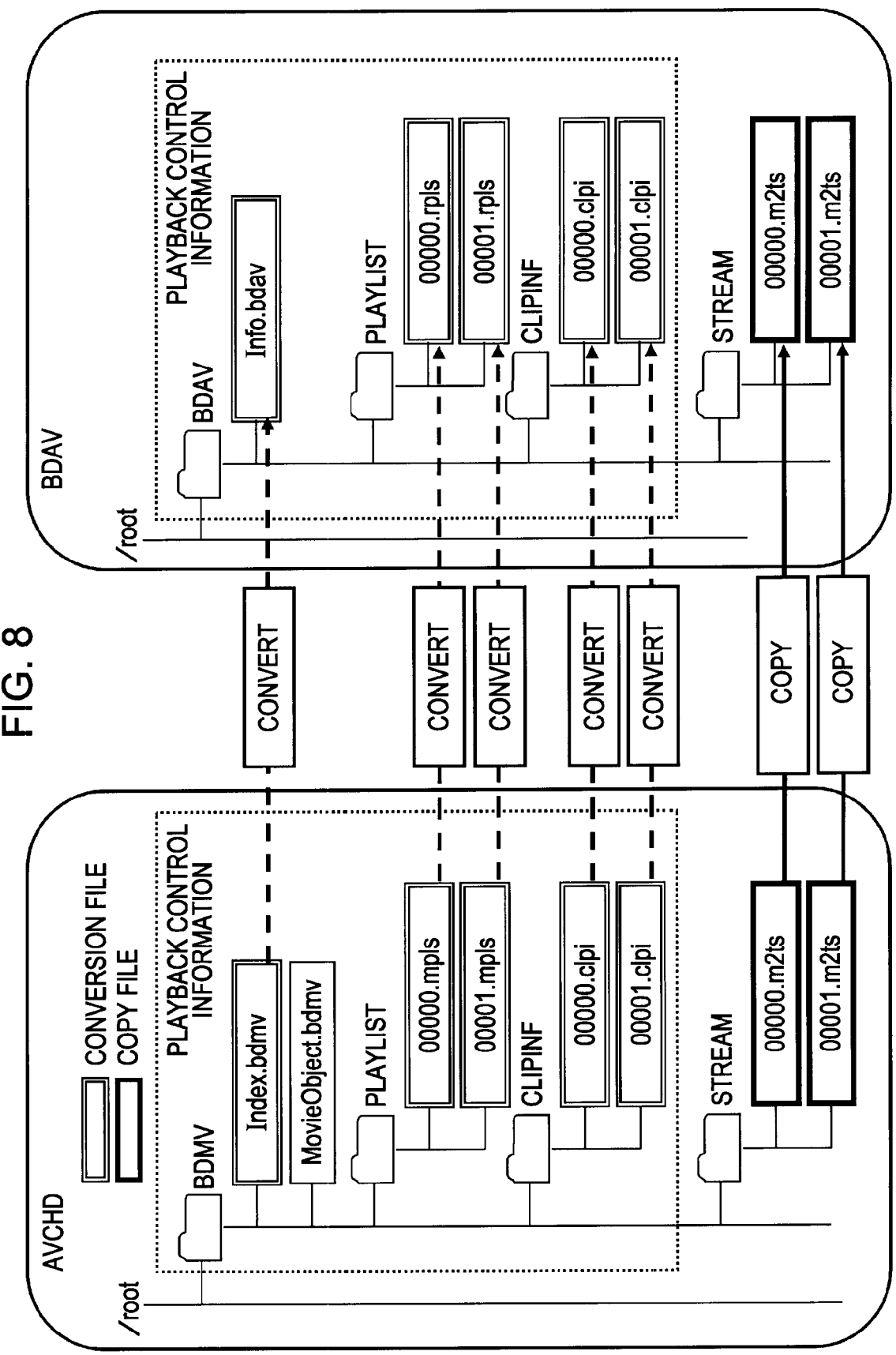
FIG. 8 is a diagram to describe a file subjected to format conversion processing from AVCHD format to BD format executed with the present invention.

FIG. 8 shows a file subject to conversion and a file subject to copying in a directory configuration. With a file set in AVCHD format, the file subject to conversion is a playback control information file of (1) index (Index) file, (2) playlist (PlayList) file, and (3) clip information (ClipInformation) file. Also, a (4) stream (AVStream) file is subject to copy processing without conversion. The movie object file is not used in BDAV format, so neither of conversion and copy processing are performed.

Figure 9:
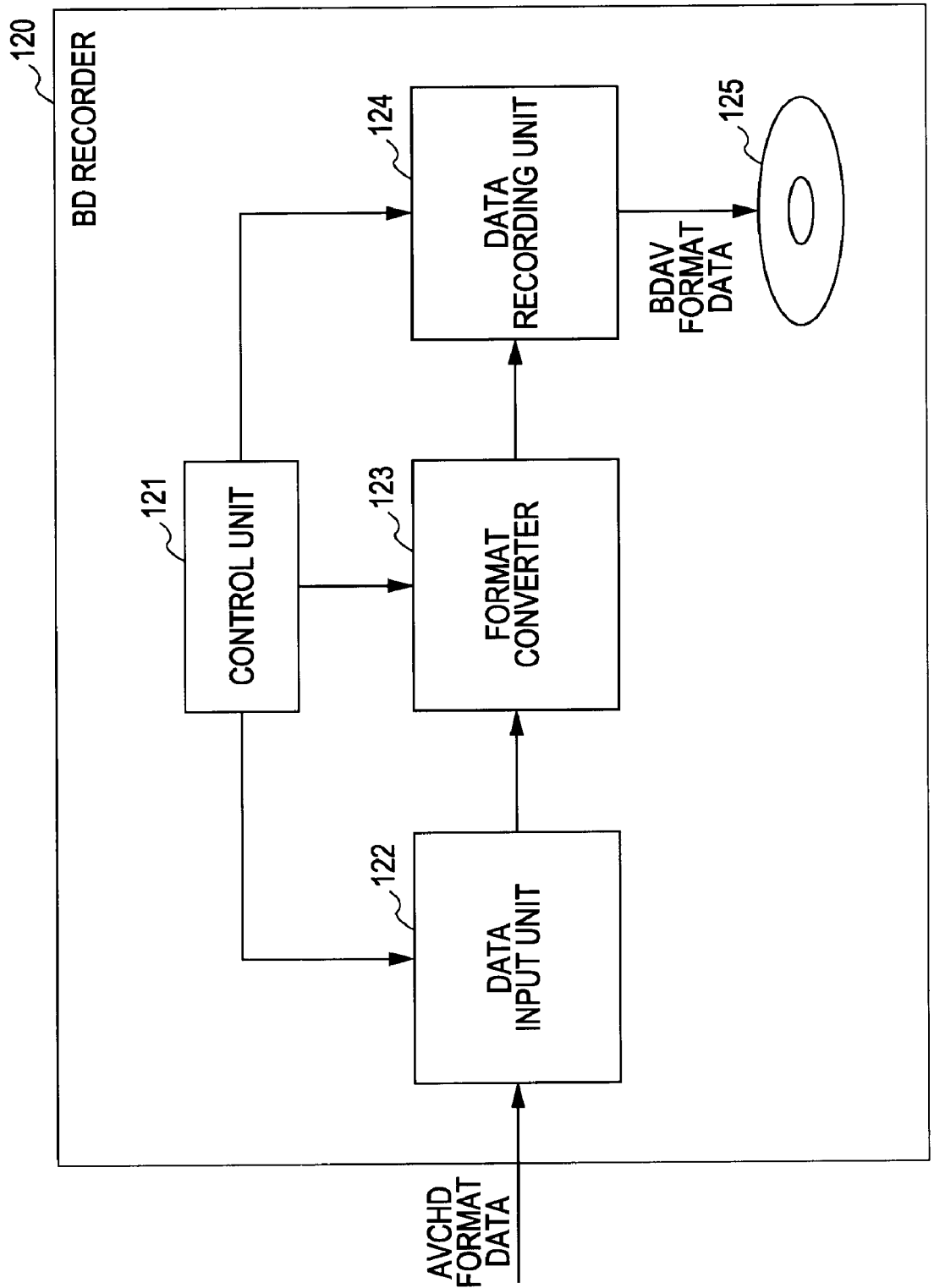
FIG. 9 is a diagram to describe a configuration example of an information processing device which executes format conversion according to an embodiment of the present invention.

FIG. 9 shows a configuration example of the BD recorder 120 according to an embodiment of the present invention. The BD recorder 120 herein corresponds to the BD recorder 120 shown in FIG. 1. The BD recorder 120 inputs AVCHD format data output from the video camera 110 (see FIG. 1) at the data input unit 122.

The AVCHD format data input by the data input unit 122 is input into the format converter 123, and the playback control information, i.e. (1) index (Index) file, (2) playlist (PlayList) file, and (3) clip information (ClipInformation) file are subjected to data conversion processing. The (4) stream (AVStream) file is subjected to copy processing without conversion.

The format converter 123 thus selects the playback control information file included in the input AVCHD format data to perform format conversion and generates playback control information according to the BDAV format, and generates BDAV format data made up of converted playback control information files and non-converted stream files without performing conversion processing as to the stream files included in the input AVCHD format data.

With the conversion processing and copy processing, the AVCHD format data is converted to BDAV format data and is input into the data recording unit 124. That is to say, the format converter 123 generates playback control information serving as playback control information according to BDAV format for a (1) management information (info.bdav) file, (2) playlist (PlayList) file, (3) clip information (ClipInformation) file, and performs copy processing without conversion for a (4) stream (AVStream) file, and outputs this resulting data to the data recording unit 124.

The data recording unit 124 records the BDAV format data onto media (Blu-ray Disc) 125. Note that the control unit 121 executes control for the series of processing herein. Note that the series of processing here is executed according to a program stored in an unshown memory.

Figure 10:
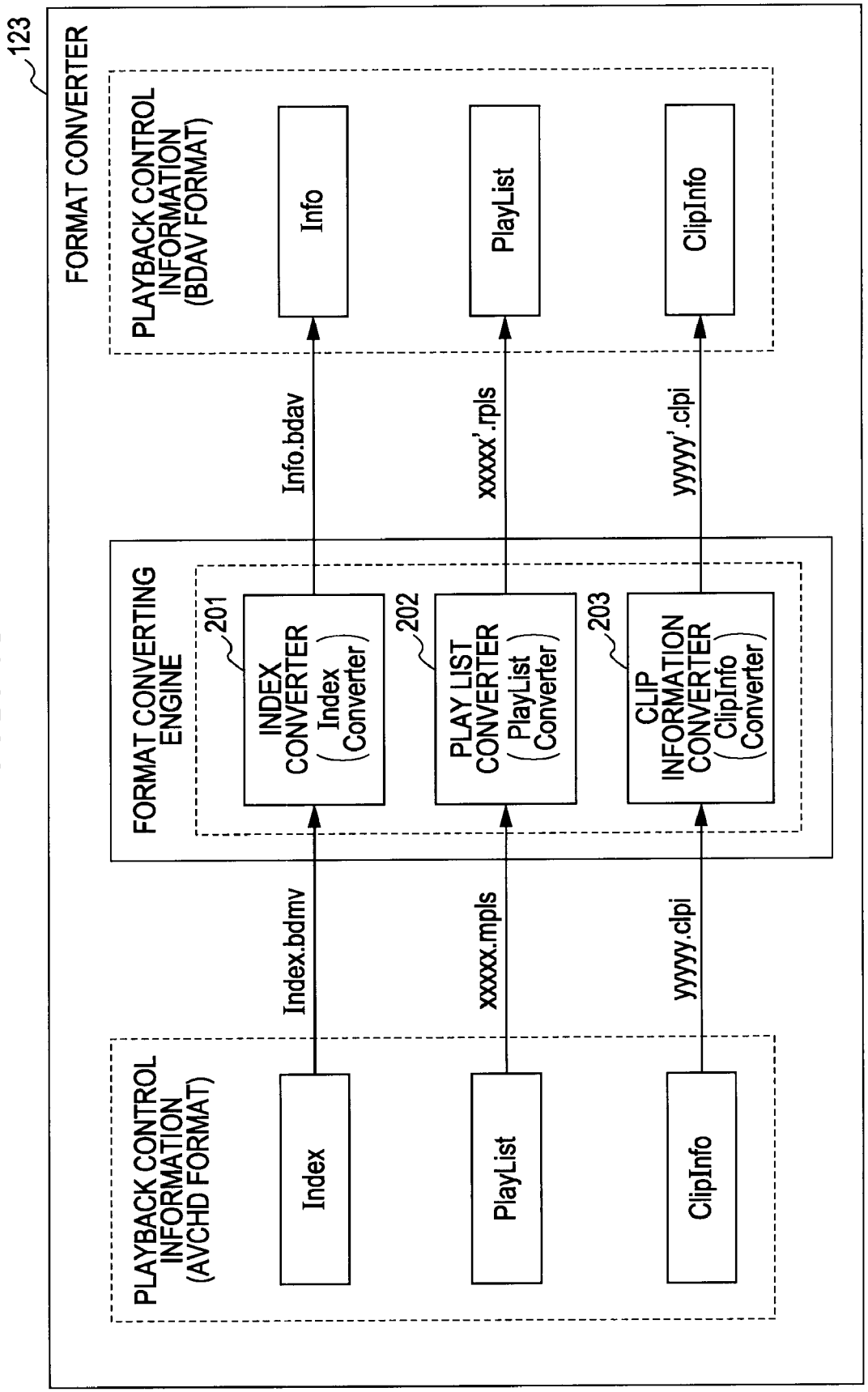
FIG. 10 is a diagram to describe a configuration example of a format converter of an information processing device which executes format conversion according to an embodiment of the present invention.

FIG. 10 shows a configuration example of the format converter 123. The configuration shown in FIG. 10 only shows processing as to the playback control information to be subject to format conversion. A format conversion engine is set with the format converter 123. The format conversion engine has the converters as follows: (1) an index converter 201 to execute conversion of an index file (Index.bdmv) according to AVCHD format and generate a management information file (Info.bdav) according to BDAV format, (2) a playlist converter 202 to execute conversion of a playlist (PlayList) file according to AVCHD format and generate a playlist (PlayList) file according to BDAV format, and (3) a clip information converter 203 to execute conversion of a clip information (ClipInformation) file according to AVCHD format and generate a clip information (ClipInformation) file according to BDAV format. Note that the various converters specifically execute processing according to a program wherein stipulated conversion rules are recorded in memory beforehand.

Figure 11:
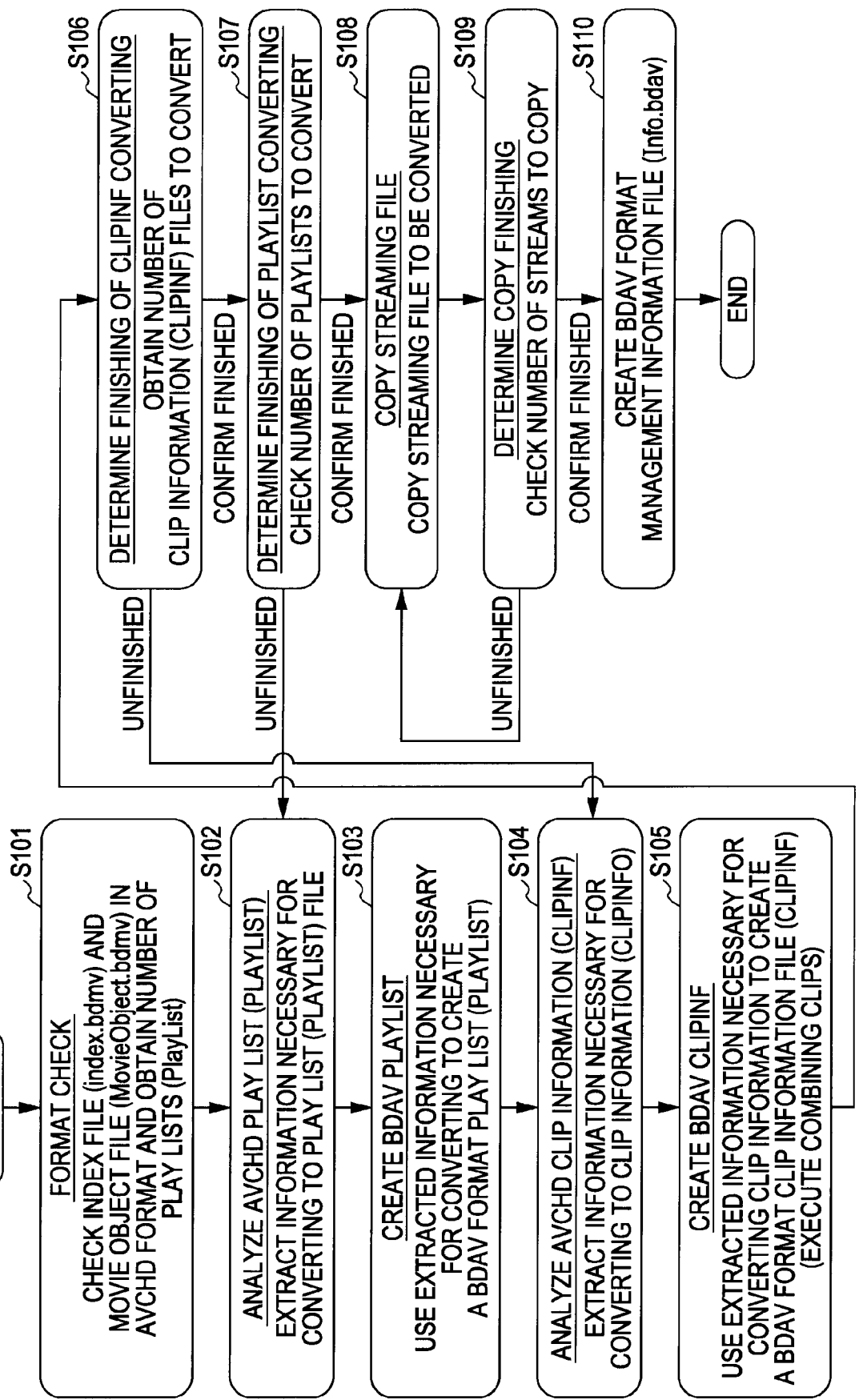
FIG. 11 is a diagram illustrating a flowchart to describe a sequence of a format conversion processing according to an embodiment of the present invention.

FIG. 11 shows a flowchart describing a sequence of the format conversion processing executed by the format converter 123. The processing for each step in the flowchart will be described.

First, in step S101, a format check is executed for the input AVCHD format data. Specifically, the index file (index.bdmv) and movie object file (MovieObject.bdmv) in AVCHD format are obtained, the recorded data for each file is checked, and the number of playlist (PlayList) files to be converted is confirmed.

Next, in steps S102 and S103, format conversion processing for the playlist files is executed. This processing is executed as processing of the playlist converter 202 of the format converter 123, and is executed for each playlist file to be converted. That is to say, this processing is repeatedly executed the number of times equivalent to the number of playlist (PlayList) files that are confirmed in step S101 and are to be converted.

First, in step S102 the playlist file in the AVCHD format data to be converted is taken out and information necessary for conversion processing of the playlist file is extracted, and in step S103 a playlist file having data configuration according to BDAV format is generated, using the extracted information.

Figure 12:
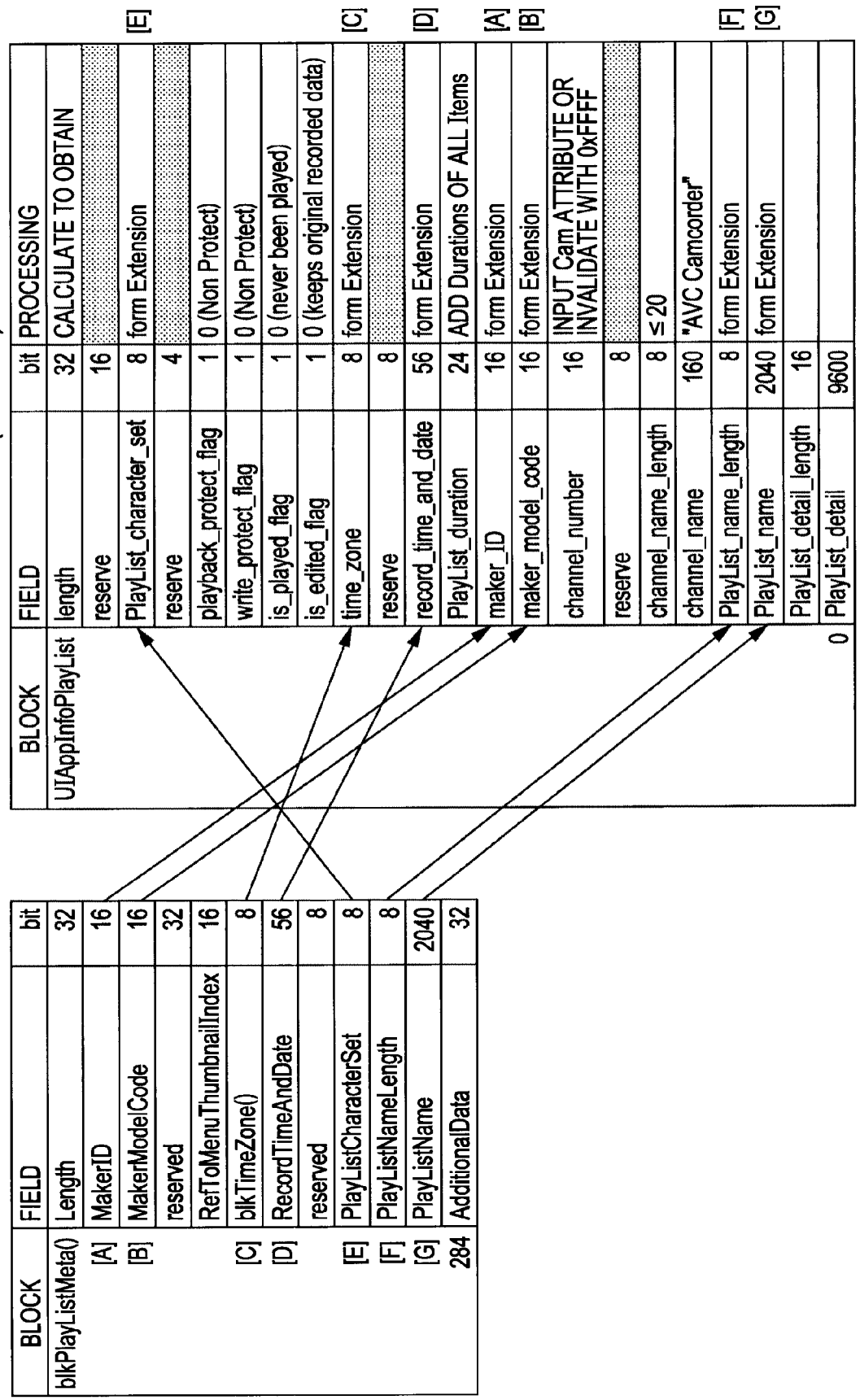
FIG. 12 is a diagram describing a playlist file conversion processing example with the format conversion processing according to an embodiment of the present invention.
Figure 14:
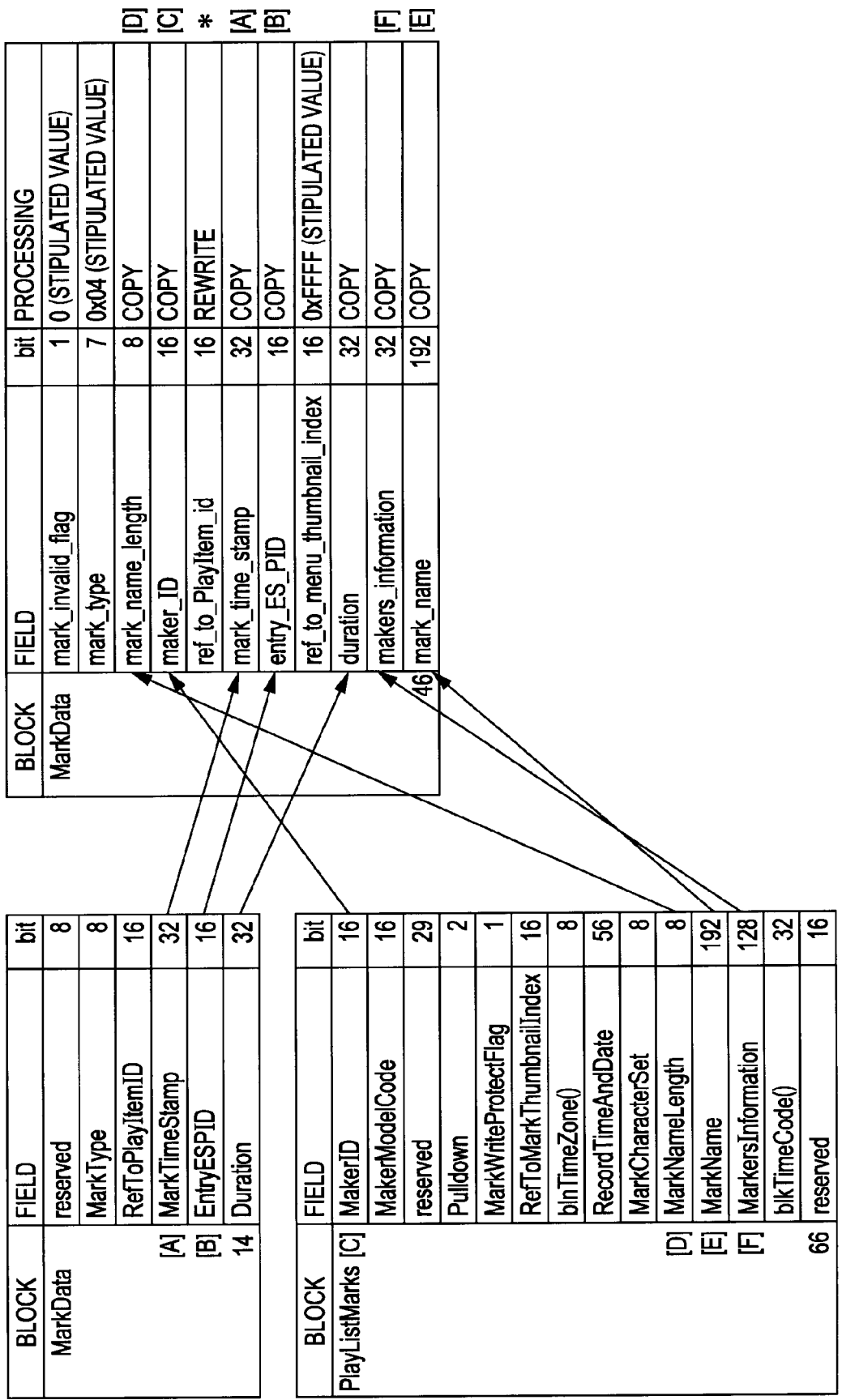
FIG. 14 is a diagram describing a playlist file conversion processing example with the format conversion processing according to an embodiment of the present invention.

A specific example of format conversion processing of a playlist file executed in steps S102 and S103 will be described with reference to FIGS. 12 through 14. FIGS. 12 through 14 show an example of format conversion for playlist file configuration data (block). A generating processing example of the data in the playlist file stipulated with BDAV format is shown as follows. (1) FIG. 12 shows processing to generate a UI application [UIAppInfoPlayList] block in the playlist file stipulated with the BDAV format, (2) FIG. 13 shows processing to generate a play item [PlayItem] block in the playlist file stipulated with the BDAV format, and (3) FIG. 14 shows processing to generate a mark data [MarkData] block in the playlist file stipulated with the BDAV format.

For example, FIG. 12 shows an example of processing to generate a UI application [UIAppInfoPlayList] in the playlist file stipulated with the BDAV format. A UI application [UIAppInfoPlayList] block is also stipulated for the playlist file with AVCHD format, but the corresponding block for AVCHD format does not have the data to be recorded in the UI application [UIAppInfoPlayList] block with BDAV format stored therein, so the recorded data of the metadata [PlayListMeta] in the playlist file stipulated with the AVCHD format is used.

The arrows shown in the diagrams show processing to obtain data of the data fields in the playlist in AVCHD format and to record this in the data field of the playlist in BDAV format. The fields [A] through [G] shown in FIG. 12 are the fields to record the recorded data of the metadata [PlayListMeta] in the playlist file in AVCHD format as it is to the fields in the [UIAppInfoPlayList] block in BDAV format. The field is described as [from Extension] in the [processing] column of the [UIAppInfoPlayList] block in BDAV format.

The shaded fields in the [UIAppInfoPlayList] block in BDAV format are fields wherein data recording is not performed. The fields other than the fields [A] through [G] and the shaded fields are fields recording a fixed value that is set beforehand or a value computed with calculation processing.

For example, the first [length] field is a field to record data length of the [UIAppInfoPlayList] block in BDAV format, and as the point-in-time that the data recording for each field is completed, the entire length of the block is calculated and the calculation result thereof is recorded.

FIG. 13 shows an example of processing to generate the play item [PlayItem] in the playlist file stipulated with BDAV format. A play item [PlayItem] block is also stipulated in the playlist file in AVCHD format, and recorded data in the corresponding block in AVCHD format is used to perform format conversion.

The arrows shown in FIG. 13 show processing to obtain data in the data fields in the playlist in AVCHD format and to record this data in the data fields in the playlist in BDAV format. The fields [A] through [D] shown in FIG. 13 are the fields to record the recorded data of the play item [PlayItem] in the playlist file in AVCHD format as it is to the fields in the [PlayItem] block in BDAV format. The field is described as [copy] in the processing column.

The fields wherein the processing column of the play item [PlayItem] in BDAV format is blacked out are fields wherein data recording is not performed.

The fields showing a [*] and described as [rewrite] in the processing column of the play item [PlayItem] block in BDAV format, i.e. the values of the two fields of (1) clip information file name [Clip_Information_file_name] and (2) reference STC-ID (identifier) [ref_to_STC_id], are fields recording the values computed according to the rules set beforehand. The value setting processing for these fields will be described in detail later.

Fields other than these are fields having a fixed value set beforehand or are fields which record the values computed with the calculation processing.

For example, the first [length] field sets a fixed value of 22 bytes with BDAV format. With the play item block in BDAV format, data recording is not performed in the data field [BridgeSequenceInfo] in the later half, and accordingly can be finalized at a fixed value of 22 bytes.

The setting processing for the values in the fields showing a [*] and described as [rewrite] in the processing column of the play item [PlayItem] block in BDAV format, i.e. the values of the two fields of (1) clip information file name [Clip_Information_file_name] and (2) reference STC-ID (identifier) [ref_to_STC_id], will be described in detail.

(1) Clip Information File Name [Clip_Information_file_name]

The clip information file name [Clip_Information_file_name] is a field recording an identifier (clip number) of a clip information file which the play item references.

The setting for the clip information file name [Clip_Information_file_name] is executed according to the rules below. Basically, values are set so that setting is not performed for duplicate clip information files [Clip_Information_file_name].

In the case of executing format conversion and recording the BDAV format data on media, a new clip is created and a clip number as to the newly created clip is set. However, in this case, the clip number should be set to a clip number not used for data already recorded on the media at the destination for recording BDAV format data. That is to say, a number not duplicating the clip number used already to record the BDAV format data on the media is determined as the clip information file name, and is recorded in the clip information file name [Clip_Information_file_name] field.

Note that the clip information file is set in increments of one AV stream file unit, and there are multiple clips generated at the time of format conversion, but for example in the case of no data already recorded on the recording destination media of BDAV format data, the clip information file name can be set as #0, #1, #2, and so forth.

On the other hand, in the case that already recorded data (clip) is recorded on the recording destination media in BDAV format data, and confirmation is made that the maximum value of the already recorded clip number is [#n], the new clip information file name relating to the newly recorded data by format conversion can be set as #n+1, #n+2, #n+3, and so forth.

(2) Reference STC-ID (Identifier) [ref_to_STC_id]

The reference STC-ID (identifier) [ref_to_STC_id] is a field for setting data region identifier information wherein continuous playback in the clip information file reference by the play item is assured.

The setting for the reference STC-ID (identifier) [ref_to_STC_id] is executed according to the rules below. Basically, values are set so that setting is not performed for duplicate reference STC-ID (identifier) [ref_to_STC_id].

In the case that the reference STC-ID (identifier) [ref_to_STC_id] is already set in the clip information file wherein the play item is set as a reference destination, e.g. in the case that the maximum value [#n] is set, the reference STC-ID (identifier) [ref_to_STC_id] is set to be incremented one at a time as #n+1, #n+2, #n+3, and so forth.

On the other hand, in the case that the clip information file wherein the play item is set as a reference destination is a newly created clip, the reference STC-ID (identifier) [ref_to_STC_id] is not set in the clip, so the reference STC-ID (identifier) [ref_to_STC_id] is set to be incremented one at a time as #0, #1, #2, and so forth.

FIG. 14 shows an example of processing to generate a mark data [MarkData] block in the playlist file stipulated with the BDAV format. The mark is briefly described in the AVCHD format description earlier with reference to FIG. 5, but the mark is a mark (Mark) showing a temporal position of playback content, and the mark data [MarkData] block is a block storing the data for the mark. The mark is user definable information which the user can freely set corresponding to information indicating a thumbnail image position such as a representative image, or chapter position information, for example. With the format conversion according to the present invention, such user defined information is also generated included in the BDAV format data after format conversion.

A mark data [MarkData] block is also stipulated in the playlist file in AVCHD format, but the fields included in the mark data [MarkData] block in BDAV format have fields not included in the mark data [MarkData] block in AVCHD format, and a portion of field data is obtained from data blocks [PlayListMarks] which is extension data of the playlist file in AVCHD format.

The arrows shown in FIG. 14 show processing to obtain the data in the data fields in the playlist in AVCHD format and to record in the data fields in the playlist in BDAV format.

The fields [A] and [B] shown in FIG. 14 are fields to record the recorded data in the mark data [MarkData] block in the playlist file in AVCHD format into the fields in the mark data [MarkData] block in BDAV format. Also, the fields [C] through [F] shown in FIG. 14 are fields to record the recorded data in the data block [PlayListMarks] block which is extension data in the playlist file in AVCHD format into the fields in the mark data [MarkData] block in BDAV format. These are fields described as [copy] in the processing column.

The field showing a [*] and described as [rewrite] in the processing column of the mark data [MarkData] block in BDAV format, i.e. the values of the field of (1) reference play item ID (identifier) [ref_to_PlayItem_id] is a field recording the value computed according to the rules set beforehand. The value setting processing for this field will be described in detail later.

Fields other than these are fields having a fixed value set beforehand or are fields which record the values computed with the calculation processing.

For example, the mark type [mark_type] field is a field which defines whether the mark type such as whether the mark is a thumbnail image or shows a bookmark or the like, but this value is unified as one fixed value in BDAV format at the time of format conversion, e.g. a value hat this example only serves as an example, and other values may be used.

The field showing a [*] and described as [rewrite] in the processing column of the mark data [MarkData] block in BDAV format, i.e. the setting processing for the values of the field of (1) reference play item ID (identifier) [ref_to_PlayItem_id] will be described in detail.

The playlist is set as specifiable by the management information file (Info.bdav) and the playlist ID is set as continuous numbers #0, #1, #2, and so forth in increments of each title. This is as shown with the play item identifiers (#0, #1, and so forth) in the playlist shown in FIG. 5 described as a configuration in AVCHD format, for example. This is similar to the BDAV format as well.

Accordingly, with the BDAV format data generated by the format conversion also, each play item identifier is set to be incremented in sequence one at a time from #0 as #0, #1, #2, and so forth in the playlist where the play item thereof belongs.

The block shown in FIG. 14 is a mark data block, and the play item ID to be referenced by the mark data is set in the reference play item ID (identifier) [ref_to_PlayItem_id] field. This setting value is set so as to be incremented in sequence one at a time from #0 as #0, #1, #2, and so forth in the playlist where the play item thereof belongs.

The description above is a description of a specific example of conversion processing of a playlist file from AVCHD format to BVAD format, with reference to FIGS. 12 through 14.

This is equivalent to the processing in step S102 and S103 in the flowchart shown in FIG. 11, where in step S102 obtaining the information necessary for conversion is executed, and in step S103 the playlist file according to BDAV format is generated using the obtained information. Note that, as described above, in the case that there are multiple playlist files generated in BDAV format, similar processing to that in steps S102 and S103 are repeatedly executed for each of the multiple files.

Next, the processing in steps S104 and S105 will be described. The processing in step S104 and S105 is processing to execute the processing of the clip information converter 203 in the format converter 123 shown in FIG. 10, and a process to generate clip information file with BDAV format data. The processing of steps S104 and S105 is executed for each clip information file to be converted.

First, in step S104, a clip information file to be converted in the AVCHD format data is obtained, information necessary for conversion processing is extracted, and in step S105, a clip information file having a data configuration according to BDAV format is generated by using the extracted information.

Figure 15:
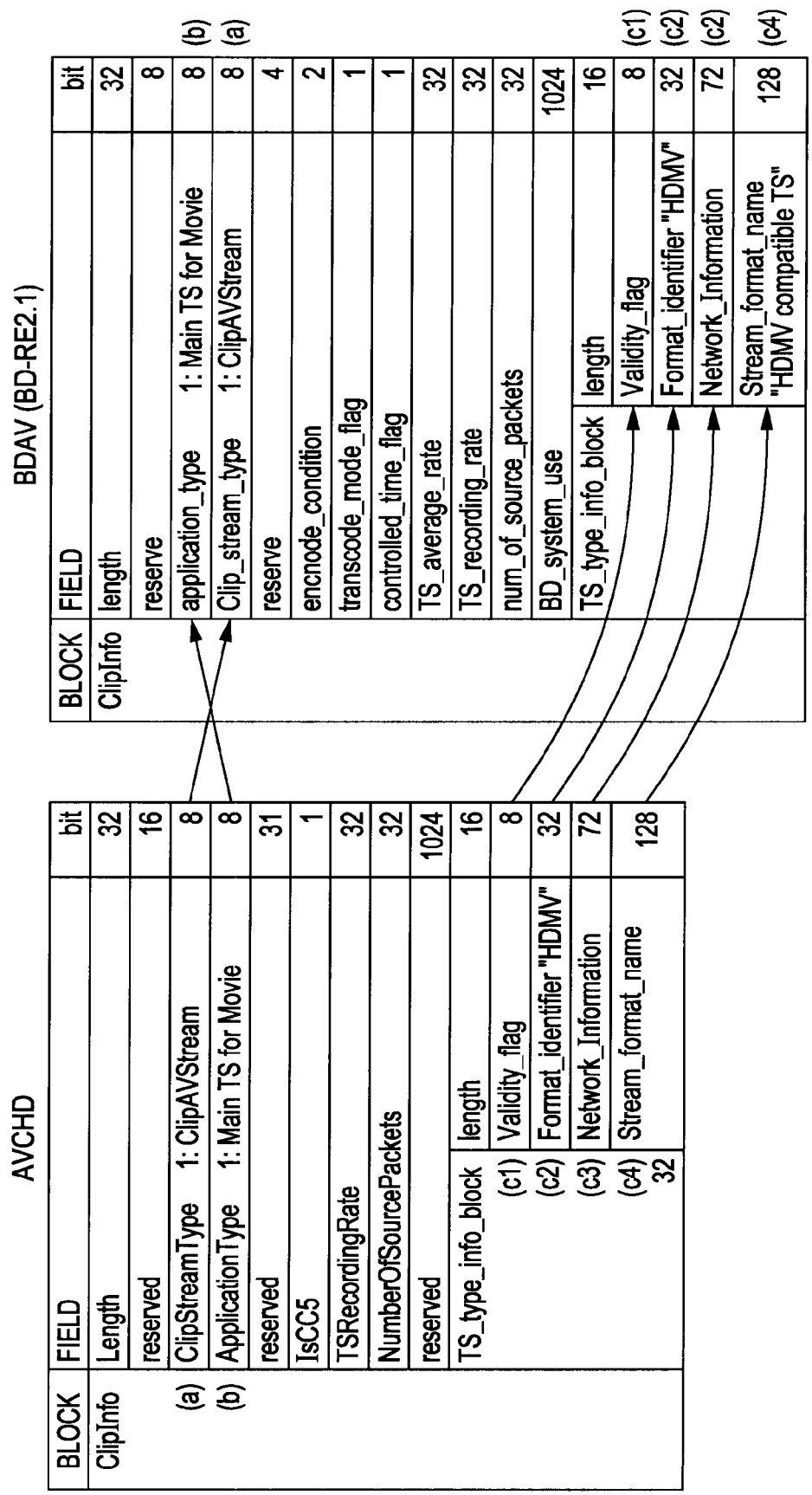
FIG. 15 is a diagram describing a clip information file conversion processing example with the format conversion processing according to an embodiment of the present invention.
Figure 16:
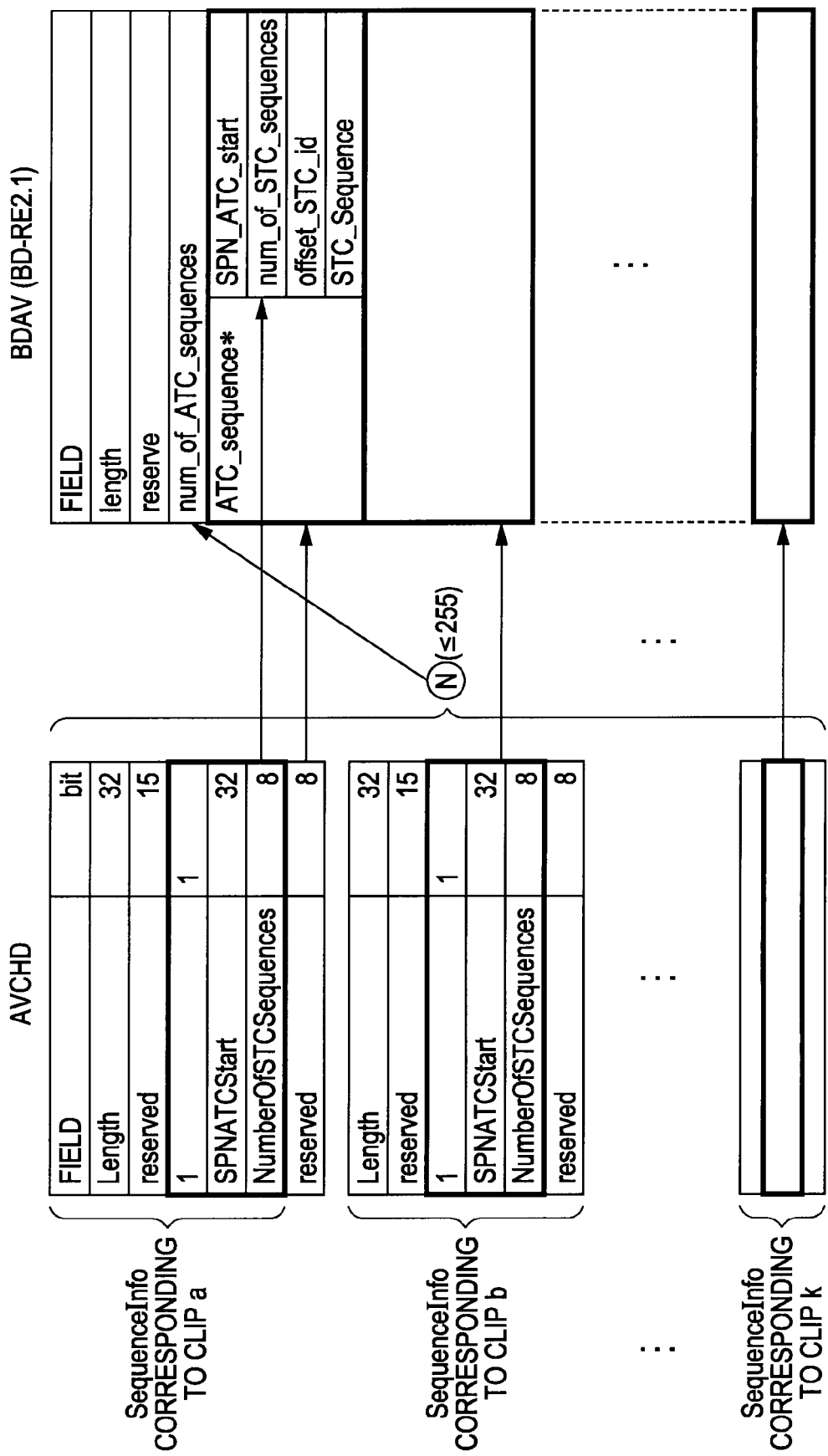
FIG. 16 is a diagram describing a clip information file conversion processing example with the format conversion processing according to an embodiment of the present invention.
Figure 17:
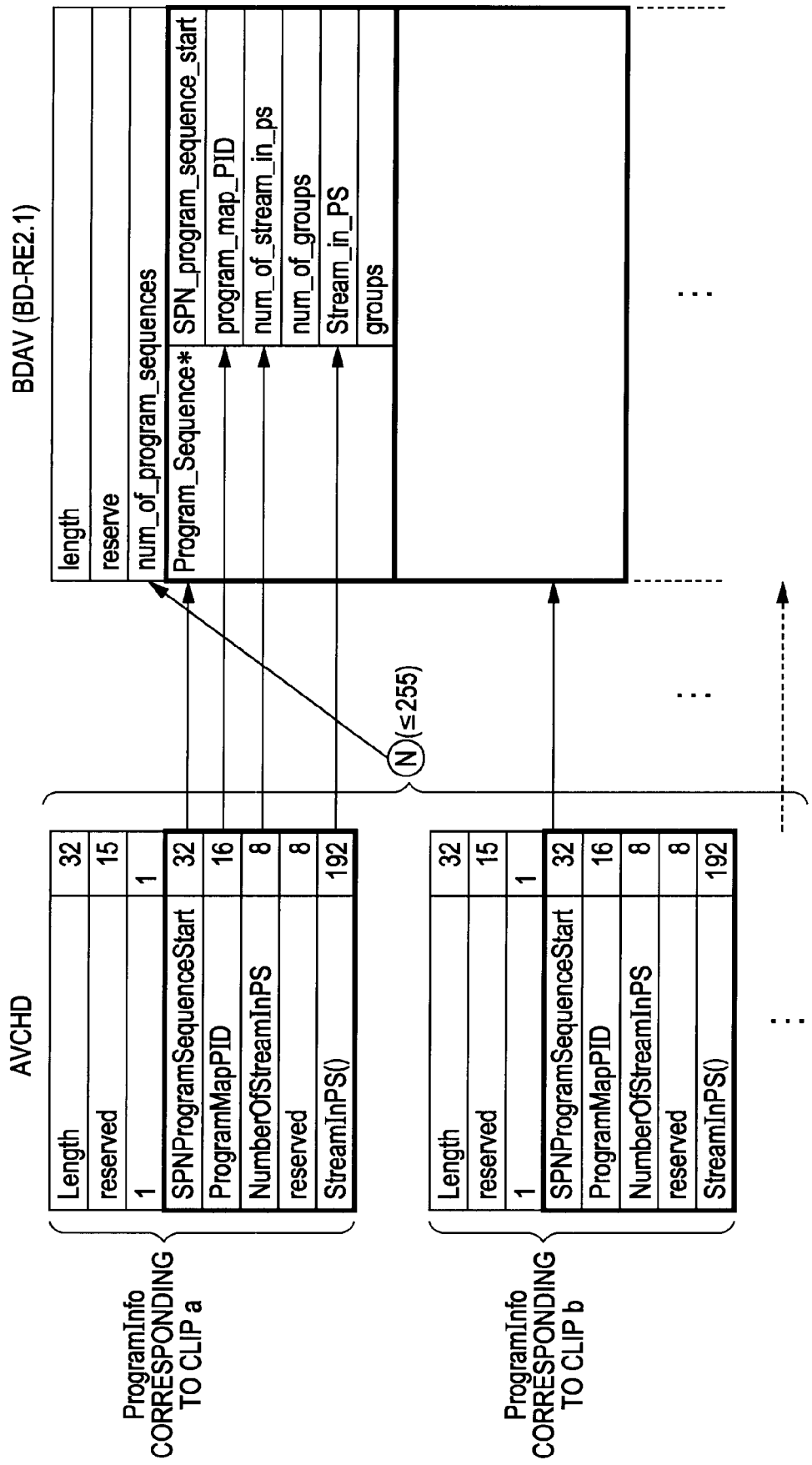
FIG. 17 is a diagram describing a clip information file conversion processing example with the format conversion processing according to an embodiment of the present invention.
Figure 18:
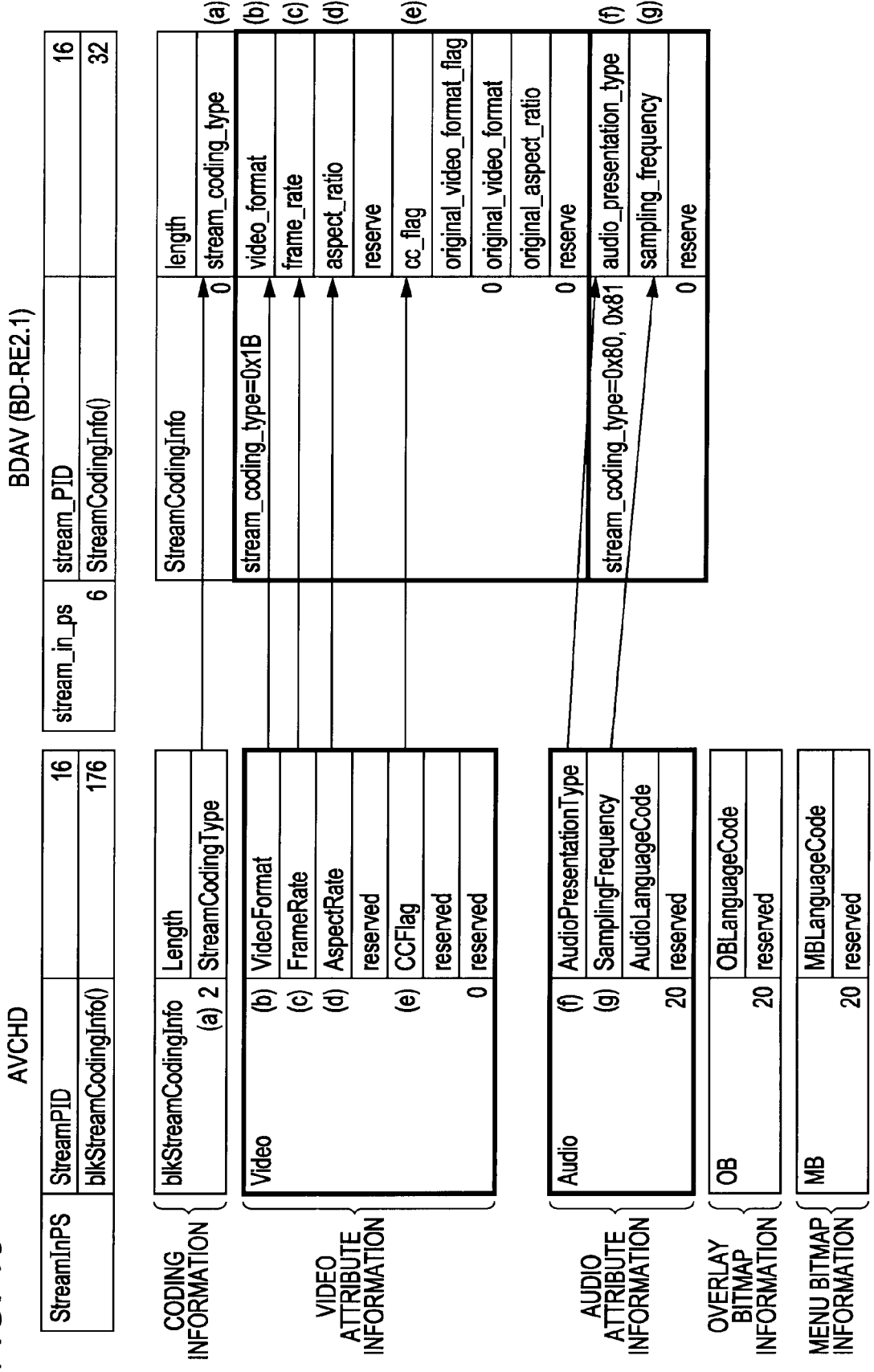
FIG. 18 is a diagram describing a clip information file conversion processing example with the format conversion processing according to an embodiment of the present invention.

A specific example of the format conversion processing of a clip information file executed in steps S104 and S105 will be described with reference to FIGS. 15 through 18. FIGS. 15 through 18 show an example of format conversion for clip information file configuration data (block). A generating processing example of the data in the clip information file stipulated with BDAV format is shown as follows. (1) FIG. 15 shows processing to generate a clip info [ClipInfo] block in the clip information file stipulated with the BDAV format, (2) FIG. 16 shows processing to generate a sequence info [SequenceInfo] block in the clip information file stipulated with the BDAV format, and (3) FIGS. 17 and 18 show processing to generate a program info [ProgramInfo] block in the clip information file stipulated with the BDAV format.

Note that the format converter 123 executes processing to merge multiple clips included in the AVCHD format data into one clip according to the BDAV format. Specifically for example, in the event of converting a clip information file in AVCHD format into a clip information file in BDAV format, clip combining processing (merge processing) is executed wherein multiple clip information files in AVCHD format are combined to become one clip information file in BDAV format.

This is because the upper limit of number of clips recordable in one recording media with AVCHD format is restricted to 4000, but the upper limit of number of clips recordable in one recording media with BDAV format is restricted to 200.

If the recorded AVCHD format data clips recorded on the media are set as is to be clips in BD format data, in the case that the upper limit value [200] is reached, the other recorded data becomes unusable. In order to avoid such a situation, in the event of conversion processing of clip information files from the AVCHD format to the BDAV format, clip combining processing (merge processing) is executed wherein the multiple clip information files in AVCHD format are combined into one clip information file corresponding to the BDAV format.

Note that in the case of combining clip information files, the information recorded in the data fields of the clip information file of the AVCHD format data is checked, determination is made as to whether the clip is combinable, and only combinable clips are combined.

FIG. 15 shows a processing example to generate a clip info [ClipInfo] block in the clip information file stipulated with the BDAV format, but whether or not the clip is permitted to combine is performed by the field data check of the clip info [ClipInfo] block in the clip information file according to the AVCHD format shown in FIG. 15.

A combinable clip is a clip wherein the field setting value of the clip info [ClipInfo] block in the clip information file in AVCHD format satisfies the conditions below.
(a) clip stream type (ClipStreamType): 1
(b) application type (Application Type): 1
(c) setting values of TS type info block (TSTypeInfoBlock)
(c1) validity flag (ValidityFlag): 10000000b
(c2) format identifier (Format_identifyer): "HDMV"

With the format converter, the recording information of the data filed of the clip information file of the AVCHD format data is checked, verification is made as to whether a value satisfying the above-described conditions is recorded, determination is made as to whether the clip is combinable according to the verification results, and performs combining processing only for the combinable clips.

As a specific example of the format conversion processing of the clip information file, first, processing to generate a clip info [ClipInfo] block in a clip information file stipulated with the BDAV format will be described with reference to FIG. 15.

A clip info [ClipInfo] block is also stipulated in the clip information file in AVCHD format, and primarily using the recorded data in this block, a clip info [ClipInfo] block in the clip information file corresponding to the BDAV format is generated.

The arrows shown in the diagram show processing to obtain data in the data filed in the clip info [ClipInfo] block in AVCHD format and to record the data in the clip info [ClipInfo] block in BDAV format. The fields (a), (b), and (c1) through (c4) as shown in the diagram are fields to record the recorded data in the clip info [ClipInfo] block in AVCHD format into the clip info [ClipInfo] block in BDAV format. Other fields in the clip info [ClipInfo] block in BDAV format set the stipulated values which are set beforehand or the values computed by the calculations.

FIG. 16 is a diagram describing processing to generate a sequence info [SequenceInfo] block in the clip information file stipulated in BDAV format. The sequence info [SequenceInfo] block is used as information to specify continuous playback segments of streaming data which is played back using the clip information files.

In the event of generating the sequence info [SequenceInfo] block, the format converter merges the information in N (N≧1) sequence info [SequenceInfo] blocks to be merged in AVCHD format, and stores this in the sequence info [SequenceInfo] block in one clip information file corresponding to the BDAV format.

That is to say, the multiple sequence info [SequenceInfo] blocks corresponding to each of the multiple clips in AVCHD format are merged and recorded in one sequence info [SequenceInfo] block according to BDAV format.

With AVCHD format, one clip information file is generated of each photography processing, for example, and sequence info a, b, ... k corresponding to the clips shown on the left side of FIG. 16 are generated one at a time along with generating the clip information file. Accordingly, a large number of clip information files according to the number of times of photography are generally set in the recording media of a video camera, and the number of sequence info [SequenceInfo] blocks corresponding to the large number of clip information files is generated.

In the event of converting from AVCHD format to BDAV format, the large number of clip information files existing in the recorded data in AVCHD format are merged to generate one clip information file corresponding to BDAV format. As described above, this is because with the BDAV format, the number of recordable clips in one media is limited to 200.

The fields shown in the sequence info [SequenceInfo] block according to BDAV format on the right side of FIG. 16 will be described.

[num_of_ATC_sequences] is a field to record the number of sequences [ATC_sequence] expressing that recording is performed over continuous time. In the BDAV format, the number of sequences recordable on one clip information file is 255 or below, so the maximum combinable number of clips is 255. As shown in FIG. 16, in the case of merging N sequence info [SequenceInfo] according to AVCHD format, the [num_of_ATC_sequences] field records [N].

The [ATC_sequence] hereafter sequentially stores sequence info in AVCHD format to be combined. However, the data recorded in each field of sequence info [SequenceInfo] in AVCHD format is not copied as is, but the values thereof are computed according to clip combining processing, and the computed values are set.

The fields set in [ATC_sequence] will be described. [SPN_ATC_start] records data expressing the start of a sequence ATC_sequence with a packet number. In the case that there is one ATC_sequence, the value is "0", matching the start of the clip AV stream file. [num_of_STC_sequences] shows the number of sequences STC_sequence on the sequence ATC_sequence. [offset_STC_id] records an offset value from start of the AV stream belonging to the clip. [STC_sequence] shows streaming data segment information wherein continuous playback of the AV stream is assured, and records a unique ID[STC_id] in the clip information file.

These data newly set values according to the merge state wherein multiple clips in AVCHD format are merged and the clip information file in BDAV format is generated. For example, [offset_STC_id] counts the number of STC Sequences in the ATC Sequence stored in one clip information file, and records the offset value computed by the count value thereof.

Thus, the sequence info [SequenceInfo] of the clip information file according to BDAV format is generated by combining the sequence info [SequenceInfo] included in multiple clip information files set with AVCHD format. However, merging processing is performed with the maximum number as 255 or less.

As described above, with the generating processing of the one clip information file according to BDAV format, the format converter 123 obtains the field data of multiple clip information files included in the AVCHD format data, performs processing to determine the field data of the one clip information file according to the BDAV format using the obtained data, and generates the clip information file according to the BDAV format.

FIGS. 17 and 18 are diagrams describing the processing to generate the program info [ProgramInfo] block in the clip information file stipulated with the BDAV format. The program info [ProgramInfo] block has information stored relating to a program of an MPEG2 system.

A program info [ProgramInfo] block is also stipulated in the clip information file in AVCHD format, and primarily using the recorded data of this block a program info [ProgramInfo] block in the clip information file corresponding to BDAV format is generated. Note that in the event of this generating processing, clip combining processing similar to that described with reference to FIG. 16 is performed, whereby the program info [ProgramInfo] block information corresponding to the N (255≧N≧1) clips in AVCHD format are merged, and a program info [ProgramInfo] block corresponding to one clip in BDAV format is generated.

As described above, with the AVCHD format, the one clip information file is generated for each photography processing, for example, and a program info [ProgramInfo] a, b . . . corresponding to the clip shown on the left side of FIG. 17 is generated along with the generating of the clip information file.

In the event of converting from AVCHD format to BDAV format, a large number of clip information files existing in the recorded data in AVCHD format are merged to generate one clip information file corresponding to BDAV format. As described above, this is because with the BDAV format, the number of clips recordable in one media is limited to 200.

As shown in FIG. 17, the merging processing obtains data in the program info [ProgramInfo] corresponding to multiple clips generated with AVCHD format, and using these data performs processing to record the field data in the [ProgramSequence] field corresponding to BDAV format.

The field data newly sets values corresponding to the merge state in the clip information file in BDAV format wherein multiple clips in AVCHD format are merged and generated.

Thus, the program info [ProgramInfo] of the clip information file according to BDAV format combines the program info [ProgramInfo] included in multiple clip information files set with the AVCHD format and is generated. However, merging processing is performed with a maximum number of 255 or less.

As with FIG. 17, FIG. 18 is a diagram describing a portion of the generating processing of a stream coding info [StreamCodingInfo] block set in the program info [ProgramInfo] of the clip information file stipulated with the BDAV format.

In the event of generating the stream coding info [StreamCodingInfo] block, only the information necessary for stipulating with the BDAV format is obtained from the AVCHD format data and recorded. This is the data (a) through (g) connected by arrows in the diagram.

Specifically, the data recorded in the AVCHD format data of coding information, video attribute information, audio attribute information and so forth are obtained and recorded in BDAV format data, but overlay bitmap information and menu bitmap information used for a menu display or button display with a video camera is information not used for playback processing with the BDAV format, so this information is moved into the BDAV format data and processing to copy is not executed.

Details of format conversion of the clip information files have been described above with reference to FIGS. 15 through 18. This processing is executed as processing in steps S104 and S105 in the flowchart in FIG. 11. In step S104, obtaining the information necessary for conversion is executed, and generating the clip information files according to BDAV format is performed using the obtained information. Note that in the case that there are multiple clip information files generated with the BDAV format, the processing in step S104 and S105 repeatedly executes similar processing for each of the multiple files. Also, in the event of this processing, clip combining processing is executed.

Next, in step S106, ending determining is executed for the conversion processing of the clip information files, and in the case of not ended, the clip information file to be subject to conversion is obtained, and the processing in steps S104 and S105 are executed. Upon confirming that the conversion processing of all clip information files being ended, the flow proceeds to step S107, and the ending determination of the playlist file is executed. In the case of not ending, the playlist file to be subject to conversion is obtained and the processing in step S102 and thereafter is executed. Upon confirming that the conversion processing for all playlist files is ended, the flow proceeds to step S108, and the copy processing for the stream file is executed.

As described above, for both the AVCHD format and the BDAV format, the stream file [nnnnn.m2ts] is configured with encoded data of the same format as MPEG4-AVC (e.g. H.264/AVC), and conversion of this streaming data is not necessary, so copy processing is executed as is. In step S109, confirmation is made as to whether or not the copying of the streaming data files to be copied is completed, and if completion is confirmed, the flow proceeds to step s110, and the management information files [Info.bdav] in BDAV format is generated. This processing is executed as processing for the index converter 201 of the format converter 123 shown in FIG. 10. In step S110 the management information file [Info.bdav] of the BDAV format is generated and format conversion is ended.

Note that with the management information file [Info.bdav] in BDAV format in step S110, the playlist file according to BDAV format generated by format conversion and the clip information file is referenced to obtain information necessary for generating the management information file [Info.bdav], and processing to write in data in the data field of the management information file [Info.bdav] is performed using the obtained information.

The above processing is executed with the format converter 123 shown in FIG. 9, and the BDAV format data generated with the format conversion is output to the data recording unit 124 and recorded on the media 125.

Specific Example of Clip Combining Processing

Next, a specific example of the clip combining processing will be described with reference to FIGS. 19 and 20. As described above, the upper limit of the number of clips recordable in one recording media is stipulated as 4000 in AVCHD format, the upper limit of the number of clips recordable in one recording media is stipulated as 200 in BDAV format.

To this end, merging of clips is executed in the event of conversion processing from AVCHD format to BDAV format, and combining multiple clips set in AVCHD format into one clip in BDAV format is performed.

Also, there may be cases wherein selective data conversion processing is performed to accompany editing processing, such as wherein only a portion of data from the AVCHD format data recorded in the video camera media is selected and converted to BDAV format data, and recorded in media of a BD recorder.

With such format conversion, clip merging processing and data selection processing is performed, whereby, as described above with reference to FIGS. 13 and 14, processing is performed to newly set the values of the fields of (1) clip information file name [Clip_Information_file_name], (2) reference STC-ID (identifier) [ref_to_STC_id], and (3) reference play item ID (identifier) [ref_to_PlayItem_id].

Thus, the format converter 123 performs processing to set new identifiers for the clip information file identifier, play item identifier, and STC identifier with the BDAV format data without using an identifier included in the AVCHD format data.

Specific processing for the identifier setting executed by the format converter 123 is as described below. For the clip information file identifier included in the BDAV format data, identifier setting processing is performed to set an identifier not used with the media recording the BDAV format data. Also, for the playlist ID (identifier), processing is performed to set the playlist identifier made up from numerical values incremented one at a time for multiple play items set in one play list included in the BDAV format data. For the STC-ID (identifier), processing is performed to set the STC identifier made up from numerical values incremented one at a time for multiple STC set in one clip information file included in the BDAV format data.

Examples of setting these identifiers will be described with reference to FIGS. 19 and 20. FIG. 19 shows the processing wherein (a) only one portion is selected from multiple play items in the playlist file set in the AVCHD format data and format conversion is executed, and (b) becomes the BDAV format. That is to say, this is format conversion processing accompanying data editing.

Multiple play items are included in one play list of the AVCHD format data of the conversion source data, and ID (identifiers) incremented one at a time from #0 such as #0, #1, #2, #3 . . . #n as play item IDs are set in these play items. Each play item is associated to one of the clip information files which are set corresponding to the AV stream equating to photography data. These are the clip information files [(00000.clpi), (00001.clpi), (00002.clpi), . . . (xxxxx.clpi)] shown in the diagrams. Note that the play items and clips are associated by clip information file name [ClipInformationFileName].

For example in the case of performing format conversion accompanying editing processing, 3 play items included in the playlist of the AVCHD format data, i.e. play item #1 (PlayItem#1), play item #2 (PlayItem#2), play item #n (PlayItem#n), and in the case that the corresponding clips only are selected format conversion executed and recorded, as shown in the lower level (b) BDAV format in the diagram, one clip is set with the clip merging processing. The clip information file name [yyyyy.clpi] corresponding to the one clip is set as a clip information file name not used with the media recording the data after format conversion, as described above.

Further, a play item subjected to conversion processing is set in the playlist after format conversion set with the BDAV format, but this identifier is not set as identifier [#1, #2, #n] which had been used in AVCHD format, but is newly set as [#0, #1, #2]. Thus the identifiers of the play items set in the playlist generated in BDAV format do not continue the play item identifiers [#1, #2, #n] which had been used in AVCHD format, but are newly set.

FIG. 20 is a diagram describing a specific example of setting processing of reference STC-ID (identifier) [ref_to_STC_id] accompanying the format conversion. Also with the STC sequence [STC_Sequence] set in the clip information file and program sequence [ProgramSequence] identifier (ID) in the case of merging the multiple AVCHD clips into one BDAV clip, the identifiers in AVCHD format are not used as is with the BDAV format data, but as shown in the diagram, are newly set so as to be incremented one at a time, as #0, #1, #2 . . . . By performing such setting, the playback processing in BDAV format can be correctly executed.

Note that with the above-described embodiment, a configuration is described to execute format conversion with the data recording device performing the data recording processing shown in FIG. 9, but as described earlier with reference to FIG. 2, the format conversion processing may be a configuration of any of (a) configuration to set the format converter on the recording device side, (b) configuration to set the format converter on the playback device side, and (c) configuration to set an independent format converting device. The format conversion processing according to the present invention can be executed with various devices.

For example, in the case that the format converter is configured in the data playback device such as a video camera, the configuration of the data playback device has a configuration as described below.

The data playback device includes a data playback unit arranged to execute data playback from media wherein AVCHD format data is recorded; a format converter arranged to select a playback control information file included in the AVCHD format data which the data playback unit plays back, performs format conversion, and generates a playback control information according to the BDAV format, and without performing conversion processing on the stream files included in the input AVCHD format data, generates BDAV format data made up of converted playback control information file and non-converted stream file, and a data output unit arranged to output the BDAV format data generated with the format converter externally.

The present invention has been described in detail above with reference to specific embodiments. However, it should be clear that one skilled in the art can make corrections and modifications insofar as they are within the scope of the present invention. That is to say, the present invention is disclosed herein in embodiments as an exemplification, and is not to be interpreted in a restrictive manner. In order to determine the essence of the present invention, the Claims should be referred to.

Also, the series of processing described in the specification may be executed with hardware, software, or a combined configuration of both. In the case of executing processing with software, a program having in which is described the processing sequence is installed in memory in a computer built into dedicated hardware to execute, or is installed in a general-use computer wherein various types of processing can be executed, so as to be executed. For example, a program can be recorded beforehand in a recording medium. Other than installing from a recording medium to a computer, the program can be received via a network such as a LAN (Local Area Network) or the Internet, and can be installed in a storage medium such as an internal hard disk.

Note that the various types of processing described in the specification are not limited to execution in time series according to the description; rather, according to processing capability of the device to execute the processing, or as necessary, the processing can be executed in parallel or individually. Also, "system" as used in the present specification is a theoretical collective configuration of multiple devices, and is not limited to devices of various configurations being housed in the same casing.

As described above, according to the configuration of an embodiment of the present invention, with a configuration to execute format conversion processing from AVCHD format to BDAV format, the format converter selects a playback control information file included in the AVCHD format data, performs format conversion, and generates a playback control information according to BDAV format, which conversion processing for the stream files included in the AVCHD format data is not performed, and BDAV format data is generated from converted playback control information files and non-converted stream files, whereby information necessary for conversion can be efficiently obtained from the selected file and file conversion can be performed, enabling high speed format conversion.

It should be understood by those skilled in the art that various modifications, combinations, sub-combinations and alterations may occur depending on design requirements and other factors insofar as they are within the scope of the appended claims or the equivalents thereof.

What is claimed is:

1. A data conversion method for an information processing device to execute format conversion processing from AVCHD (Advanced Video Codec high Definition) format to BDAV (Blu-ray Disc Audio Visual) format, said method comprising the steps of:
performing data input, using a data input unit, by inputting AVCHD format data that includes a playback control information file and a stream file, the stream file having a same file format in both the AVCHD format and the BDAV format; and
performing format conversion, using a format converter, on the input AVCHD format data by
selecting the playback control information file included in the input AVCHD format data,
performing format conversion on the selected playback control information file, without performing format conversion on the stream file included in the input AVCHD format data,
generating playback control information according to the BDAV format, and
generating BDAV format data that includes a converted playback control information file and the stream file that has not been converted.

2. The data conversion method according to claim 1, further comprising the step of:
performing data recording, using a data recording unit, by recording the BDAV format data generated by said format converter onto media.

3. The data conversion method according to claim 1, wherein said format conversion step includes a step of:
executing processing by
selecting an index file, a playlist file, and a clip information file as a playback control information file included in the AVCHD format data to be converted, and
generating a management information file, playlist file, and clip information file according to the BDAV format, by format conversion of the selected file.

4. The data conversion method according to claim 1, wherein said format conversion step includes a step of:
executing processing by
merging a plurality of clips included in the AVCHD format data into one clip according to the BDAV format.

5. The data conversion method according to claim 1, wherein said format conversion step, with generating processing for one clip information file according to the BDAV format, includes the steps of:
obtaining field data for a plurality of clip information included in AVCHD format data; and
using the obtained data to determine the field data of one clip information file according to the BDAV format.

6. The data conversion method according to claim 1, wherein, regarding a clip information file identifier, play item identifier, and STC identifier, said format conversion step includes a step of:
setting new identifiers for the BDAV format data without using the identifiers in the AVCHD format data.

7. The data conversion method according to claim 6, wherein said format conversion step includes a step of:
performing identifier setting processing, wherein the identifier of the clip information file included in the BDAV format data serves as an identifier not used with the media that records the BDAV format data.

8. The data conversion method according to claim 6, wherein said format conversion step includes a step of:
performing setting processing for playlist identifiers made up of numerical values incremented by 1 at a time, for a plurality of play items set in one playlist included in the BDAV format data.

9. The data conversion method according to claim 6, wherein said format conversion step includes a step of:
performing setting processing for STC identifiers made up of numerical values incremented by 1 at a time, for a plurality of STC set in one clip information file included in the BDAV format data.

10. The data conversion method according to claim 1, wherein said format conversion step includes a step of:
employing user defined data included in the AVCHD format to generate user defined data corresponding to the BDAV format.

11. The data conversion method according to claim 1, wherein said format conversion step includes a step of:
employing mark information included in the AVCHD format to generate a mark information block according to BDAV format, for information relating to a mark (Mark) indicating a certain temporal position in the playback content.

12. The data conversion method according to claim 1, wherein the stream file in both the AVCHD format data and the BDAV format data has an m2ts file extension.

13. A data converting device configured to execute format conversion processing from AVCHD (Advanced Video Codec high Definition) format to BDAV (Blu-ray Disc Audio Visual) format, said device comprising:
a data input unit to input AVCHD format data that includes a playback control information file and a stream file, the stream file having a same file format in both the AVCHD format and the BDAV format; and
a format converter to
select the playback control information file included in the input AVCHD format data via said data input unit,
perform format conversion on the selected playback control information file, without performing format conversion on the stream file included in the input AVCHD format data,
generate playback control information according to the BDAV format, and
generate BDAV format data that includes a converted playback control information file and the stream file that has not been converted.

14. The data converting device according to claim 13, wherein said format converter executes processing to
select an index file, a playlist file, and a clip information file as a playback control information file included in the AVCHD format,
and with the format conversion of the selected file, generate a management information file, playlist file, and clip information file according to the BDAV format.

15. The data converting device according to claim 13, wherein said format converter executes processing to merge a plurality of clips included in the AVCHD format data into one clip according to the BDAV format.

16. A data recording device configured to execute format conversion processing from AVCHD (Advanced Video Codec high Definition) format to BDAV (Blu-ray Disc Audio Visual) format, and execute data recording as to media, said device comprising:
a data input unit to input AVCHD format data that includes a playback control information file and a stream file, the stream file having a same file format in both the AVCHD format and the BDAV format;
a format converter to
select the playback control information file included in the input AVCHD format data via said data input unit,
perform format conversion on the selected playback control information file, without performing format conversion on the stream file included in the input AVCHD format data,
generate playback control information according to the BDAV format, and
generate BDAV format data that includes a converted playback control information file and the stream file that has not been converted; and
a data recording unit to record the BDAV format data generated by said format converter on the media.

17. A data playback device configured to execute format conversion processing from AVCHD (Advanced Video Codec high Definition) format to BDAV (Blu-ray Disc Audio Visual) format, and output converted data, said device comprising:
a data playback unit to execute data playback from the media wherein AVCHD format data is recorded, the AVCHD format data including a playback control information file and a stream file, the stream file having a same file format in both the AVCHD format and the BDAV format;
a format converter to
select the playback control information file included in the AVCHD format data to be played back by said data playback unit,
perform format conversion on the selected playback control information file, without performing format conversion on the stream file included in the AVCHD format data,
generate playback control information according to the BDAV format, and
generate BDAV format data that includes a converted playback control information file and the stream file that has not been converted; and
a data output unit to output the BDAV format data generated by said format converter externally.

18. A non-transitory computer-readable storage medium including computer executable instructions, wherein the instructions, when executed by a computer, cause the computer to perform a method for format conversion processing from AVCHD (Advanced Video Codec high Definition) format to BDAV (Blu-ray Disc Audio Visual) format, said method comprising the steps of:
performing data input, using a data input unit, by inputting AVCHD format data that includes a playback control information file and a stream file, the stream file having a same file format in both the AVCHD format and the BDAV format; and
performing format conversion, using a format converter, on the input AVCHD format data by
selecting the playback control information file included in the input AVCHD format data, performing format conversion on the selected playback control information file, without performing format conversion on the stream file included in the input AVCHD format data, generating playback control information according to the BDAV format, and generating BDAV format data that includes a converted playback control information file and the stream file that has not been converted.

* * * * *